United States Patent
Chang et al.

(10) Patent No.: US 11,368,195 B2
(45) Date of Patent: Jun. 21, 2022

(54) ACTIVE SCATTERING FOR BANDWITH ENHANCED MIMO

(71) Applicants: Donald C. D. Chang, Thousand Oaks, CA (US); Juo-Yu Lee, Camanillo, CA (US)

(72) Inventors: Donald C. D. Chang, Thousand Oaks, CA (US); Juo-Yu Lee, Camanillo, CA (US)

(73) Assignee: Spatial Digital Systems, Inc., Camarillo, CA (US)

( * ) Notice: Subject to any disclaimer, the term of this patent is extended or adjusted under 35 U.S.C. 154(b) by 86 days.

(21) Appl. No.: 14/288,707

(22) Filed: May 28, 2014

(65) Prior Publication Data

US 2015/0009892 A1    Jan. 8, 2015

(51) Int. Cl.
  *H04B 7/0452*  (2017.01)
  *H04B 7/155*   (2006.01)
  *H04W 16/28*   (2009.01)

(52) U.S. Cl.
  CPC ....... *H04B 7/0452* (2013.01); *H04B 7/15535* (2013.01); *H04W 16/28* (2013.01)

(58) Field of Classification Search
  CPC .............................. H04B 7/0452; H04W 16/28
  See application file for complete search history.

(56) References Cited

U.S. PATENT DOCUMENTS

| | | | | |
|---|---|---|---|---|
| 6,785,513 B1 * | 8/2004 | Sivaprakasam | ...... | H04B 7/0617 455/11.1 |
| 2007/0160014 A1 * | 7/2007 | Larsson | ................ | H04B 7/022 370/338 |
| 2008/0165720 A1 * | 7/2008 | Hu | ...................... | H04B 7/0632 370/315 |
| 2008/0299896 A1 * | 12/2008 | Mohebbi | ............. | H04B 7/0802 455/8 |
| 2009/0092073 A1 * | 4/2009 | Doppler | ................ | H04B 7/022 370/315 |
| 2009/0325481 A1 * | 12/2009 | Mohebbi | ............. | H04B 7/1555 455/15 |
| 2011/0032173 A1 * | 2/2011 | Chang | ..................... | H01Q 3/04 343/880 |
| 2013/0070677 A1 * | 3/2013 | Chang | ................ | G01S 13/9303 370/328 |

\* cited by examiner

*Primary Examiner* — Yaotang Wang
(74) *Attorney, Agent, or Firm* — Phuong-Quan Hoang

(57) ABSTRACT

Embodiments of a communications system with multiple active scattering devices to service multiple users either indoor or outdoor over same spectrum in a communication network and a method for the system are generally described herein. Signals streams for transmission to users in spoke-and-hub configurations will utilize multiple active scattering devices. Three categories of operational concepts are presented: (1) multiple scattering devices arranged geometrically bundled together to function as active mirrors or retro-directive repeaters, (2) distributed man-made scattering devices placed to enhance channel bandwidth in between a hub and a common service area via frequency re-use, and (3) organizing distributed active scattering devices by remote beamforming for servicing a small common coverage area indoor or outdoor with enhanced bandwidth. All three techniques are for service with enhanced bandwidth and angular resolutions via frequency reuse, and extended service range via coherent operations of scattering devices.

22 Claims, 33 Drawing Sheets

Redundant data transport via WF muxing and OB beams with active scatters in a channel

ACTIVE SCATTERING FOR BANDWITH ENHANCED MIMO

RELATED APPLICATION

This application claims priority to U.S. provisional application No. 61/905,540, filed on Nov. 18, 2013, which is incorporated herein by reference in its entirety. U.S. patent application Ser. No. 14/182,665, filed Feb. 18, 2014, entitled "Multi-user MIMO via frequency re-use in smart antenna," is incorporated herein by reference in its entirety. U.S. patent application Ser. No. 14/193,540, filed Feb. 28, 2014, entitled "Multi-user MIMO via active scattering platforms," is also incorporated herein by reference in its entirety. Present invention relates to active scattering devices, including repeaters, transponders, and antennas. It is also related to multiple-input-multiple-output (MU MIMO) communications systems and wavefront multiplexing/demultiplexing (WF muxing/demuxing) technologies.

DESCRIPTION

A multiple-user communications system for a point-to-multipoint (p-to-mp) via active scattering repeaters for efficient frequency reused is described. The propagations channels dominated by multipath effects are characterized by a composited transfer function technique. One feature of the systems is a multipath dominated MIMO communications channel comprising of multiple active scattering repeaters.

TECHNICAL FIELD

The present invention relates to multiple-user multiple-input-multiple-output (MU MIMO) communications systems through propagation scattering from distributed repeaters. Functions of a repeater comprises of receiving elements, low-noise-amplifying, filtering, power-amplifying, and re-radiating elements. These repeaters serve only as active scatters not as small or micro cells which are connected to backbones of wires networks in many advanced cell structured communications architectures. The invention is also related to wavefront multiplexing/demultiplexing (WF muxing/demuxing) technologies.

The objectives for the invention is to provide means altering propagating channel characteristics via multiple active scattering devices for (1) multiple users to more efficiently re-use allocated spectrum concurrently in MIMO communications configurations, and (2) enabling these users to share allocated resources dynamically and efficiently. Conventional MIMOs take advantage of scattering in a multi-path dominated communication channel which is typically characterized by many "transfer functions". A transfer function, $h_{ij}$, is for typical measurements of propagation delays and attenuation from an ith source element in transmit to a jth destination element in receiving through the multipath dominated communications channel.

SUMMARY OF THE INVENTION

This disclosure on communications systems is summarized as followed:
Communications channels from a transmitting source to multiple receiving destinations are through active scattering from many distributed scattering devices including repeaters and transponders.
Frequency reuse is accomplished by directional diversity in transmitters via formulations of point-to-multipoint (p-to-mp) composited transfer functions and optimizations on the formulated functions under multiple specified performance constraints for user identifications and discriminations.
Optimizations are through beam shaping techniques under performance constraints associated with locations indexed by user identifications or indexed by user element identifications.
A composited transfer function is optimized to represent an optimally shaped beam, featuring a point-to-multipoint (p-to-mp) characteristics including integrated multipath propagation effects of actively scattering repeaters/transponders with favorable connectivity for one specified user and discrimination against others.
A composited transfer function for transmitting data through multipath dominated channels
used for specified performance constraints for a shaped transmitting beam
1. a radiation pattern, or a wavefront, of the shaped beam is a linear combination, or a weighted sum, from radiation patterns, or wavefronts, of multiple transmitting elements
2. shaping a radiation pattern are through altering the weighting parameters of the linear combination,
used for specified performance constraints for a shaped receiving beam
1. a reception pattern, or a wavefront, of the shaped receiving beam is a linear combination, or a weighted sum, from reception patterns of multiple receiving elements
2. shaping a reception pattern are through altering the weighting parameters of the linear combination,
performance constraints for optimization via
1. Orthogonal beam (OB) criteria
2. Quiet zone criteria, and
3. Others.
Multiple concurrent beams are optimized under performance constraints by a set of many composited transfer functions.

This disclosure describes exemplary embodiments on improving the operation and use of MIMO communication methods and systems for multiple users (MU) to re-use same spectrum such as through channel state information (CSI) to form performance constraints in user-selection and/or rejection processing on transmission or reception side. Embodiments pertain to wireless communications through a multipath dominated channel, where the multipaths are dominated through man-made active scattering devices including repeaters and transponders. These repeaters/transponders are in parallel scattering paths between a signal source to multiple destinations providing amplifications, delays and directional adjustments for propagating signals.

When the sources and destinations are in door for many embodiments, distributed repeaters serve as active scatters, which perform receiving, low-noise-amplifying, filtering, power-amplifying, and re-radiating functions for signals through the repeaters. To avoid self-triggered oscillations, many repeaters may feature slight frequency shifts, or stored and forward capability. Some repeaters may feature input and outputs at a same carrier frequency but with large spacing between transmitting and receiving elements.

For many other embodiments, distributed transponders serve as active scatters, which perform functions of receiving, low-noise-amplifying, filtering, frequency translating, power-amplifying, and re-radiating for signals in a transmitting frequency.

A repeater may consist of two transponders spatially separated in two locations but cascaded functionally. A first transponder is for receiving functions capturing desired signals in $f_1$, which are amplified, filtered, and frequency translated before radiated out by a separated aperture at $f_{2m}$. A second transponder captures the amplified signals at $f_{2m}$, which are amplified, frequency translated, filtered, and power amplified before radiated out by another separated aperture at $f_1$.

In some embodiments, MIMO configurations feature a point-to-point (p-to-p) architecture with a source at a communication hub via radiations to multiple repeaters and then re-radiations from these repeaters to a destination which is in a common coverage of these repeaters. The MIMO configurations may also feature a point-to-multipoint (p-to-mp) architecture with a source at a communication hub via radiations to multiple active scattering devices, and then re-radiation from the multiple scattering devices to multiple destinations.

In the MIMO systems of present invention, serving signals for transmission to user equipment (UE) via multiple paths will utilize composited transfer functions selected and characterized based on channel state information (CSI), which comprises of responses from probing signal sequences for a propagation channel dominated by multipaths in accordance with a dynamic user distribution. Each propagating path may feature unique functional effects from a set of scattering devices. The composited transfer functions are constructed or shaped to be "user dependent" with enhanced responses to a selected user and suppressed ones for other users. When operating in coordinated modes, more cooperating UEs are configured to suppress interference to other UE using the same frequency resources. Optimization methods for the composited transfer functions based on selected criteria have been presented in related patent applications listed above.

Some embodiments relate to coordinated point-to-multipoint (p-to-mp) communications in spoke-and-hub configurations. The criteria for shaping the composited transfer functions for a transmitter in a communications hub may include those in many beam-shaping techniques, such as orthogonal beams (OB), quiet-zones, and others. Some embodiments relate to wavefront multiplexing (WF muxing)/demultiplexing (demuxing) as means for coordinated or organized concurrent propagations through multipath dominated channels. As a result, methods for calibrations and equalizations among multiple path propagations become possible. Some are through forward paths only. Consequently, implementations of techniques on coherent power combining in receivers for enhanced signal-to-noise ratios (SNR) are simple and cost effective.

BACKGROUND

Wireless communication using multiple-input multiple-output (MIMO) systems enables increased spectral efficiency for a given total transmit power. Increased capacity is achieved by introducing additional spatial channels in multipath dominated propagation environment, which are exploited by various techniques such as spatial multiplexing, space-time (Block) coding and others as a part of pre-processing to maximize isolations among these parallel channels. Many MIMO systems feature enhanced spectral efficiency for single users. A single use MIMO features a single multi-antenna transmitter communicating with a single multi-antenna receiver. Given a MIMO channel, duplex method and a transmission bandwidth, a system can be categorized according to (1) flat or frequency selective fading, and/or (2) with full, limited, or without transmitter channel state information (CSI).

In contrast, multi-user MIMO (MU-MIMO) is a set of advanced MIMO (multiple-input and multiple-output) technologies where the available antennas are spread over a multitude of independent access points and independent radio terminals—each having one or multiple antennas. To enhance the communication capabilities of all terminals, MU-MIMO applies an extended version of space-division multiple access (SDMA) to allow multiple transmitters to send separate signals and multiple receivers to receive separate signals simultaneously in the same frequency or time slots, or with same codes in the same frequency or time slots. There have been many MIMO-OFDM systems for multiple user applications. Different users will use various sets of distribution patterns over the same bandwidth over which orthogonal frequency components are radiated.

In this invention application, our techniques exploit three aspects of propagation channels for multiple user MIMO systems: (1) the multiple parallel paths are through multiple active repeaters; (2) shaping MIMO channel transfer functions based on available channel state information (CSI) at transmission side including effects of propagating through multiple active scattering repeaters, and (3) applying WF multiplexing to efficiently sharing power and bandwidth provided by these active scatters among multiple users. Propagation channels with multiple paths are "enhanced" or "engineered via these active devices in parallel in between a source and destinations.

Present invention features additional pre-processing at transmission side on available channel state information (CSI) which is formulated via channel transfer functions/matrices, or simply composited transfer functions, or composited transfer matrices. The preprocessors are built as to formulate a new set of direction dependent aggregated MIMO transfer functions via linear combinations of multiple transmitting antennas as beam forming networks, and to "shape" the aggregated MIMO transfer functions under prescribed performance constraints. As a result, inputs of the preprocessors become accessible to user-selectable composited transfer functions via beam shaping and optimization algorithms, similar to many in smart beam shaping techniques. However, the discrimination parameters for composited transfer functions will not be "constrained" in directions as those specified in conventional shaped beams. The constraints in the composited transfer functions are identified (ID) as "user indexed" or specified as "user ID indexed". These user indexed performance constraints effectively enable optimizations for composited transfer functions so that frequency re-use via "directional diversity" become possible.

A composited transfer function optimized under a finite number of user indexed performance constraints is a spatially sampled subset of an optimally shaped beam viewed through a dynamic communication channel dominated by multipaths. In other words, this optimized function features integrated effects of an optimally shaped beam cascaded by effects of multiple active scattering paths and propagation in a communications channel. The function is optimized under the user indexed performance constraints via a selected optimization algorithm. It is important to notice that the positions and orientations of the active repeaters will alter the effects of propagations in the communications channel.

Composited transfer functions shaped for enhanced isolations among multiple users will have distinct responsive features to various users. For a two-user MIMO example in a multipath dominated environment; a first set of parallel preprocessors for transmission in a hub may feature composited transfer functions, characterizing propagation paths from inputs of the pre-processors all the way to various elements of the two user antennas, with "high" intensity responses to antenna elements of a first users while concurrently showing "low" intensity responses to a second users. Similarly, a second set of preprocessors may feature complex transfer functions with "low" intensity responses to all antenna elements of the first users while concurrently showing "high" intensity responses to those of the second users.

Outputs of two conventional MIMO processors, one for the first user and the other for the second user, are respectively connected to the inputs of the two sets of the preprocessors. The multiple outputs of the pre-processors are then connected to the same suite of the transmitting antenna elements. As a result, spectrum can be reused multiple times for better spectrum utility efficiency.

Our receiver approaches include techniques incorporating multiple antenna elements and using space-time-frequency adaptive processing. Coordinated multi-user communication networks coordinate and/or combine signals from multiple antenna elements or base stations to make it possible for mobile users to enjoy consistent performance and quality when they access and share videos, photos and other high-bandwidth services, whether they are close to the center of their serving cell or at its outer edges. One issue with these networks is that conventional channel quality feedback schemes do not take into account a reduction in interference that can be achieved by coordination. Thus, there are general needs for these networks and methods for beamforming coordination that take into account the reduction in interference that results from the coordination of the base stations. There are also general needs for channel quality feedback schemes suitable for interference suppression in a coordinated multi-user network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Directional repeaters are used in most of the illustrations for active scattering in a communications channel dominated by multipath propagations. Active scattering provide "amplifications" for scattered signals. In many embodiments, other types of repeaters, including non-directional and configurable ones, may be incorporated as active scattering in a multipath dominated communications channel. Transponders are also active scattering devices with amplified outputs at frequencies different from those of input signals. Many repeaters/transponders, which are stationary and anchored on walls, in ceilings, behind paintings, on picture frames, and on top of other objects, are referred to as anchored to stationary platforms. Many of those anchoring platforms are relocatable (e.g. table lights), or slow swinging (e.g. campanulas, or chandeliers).

Similar concepts are extendable to those repeaters in mobile platforms such as passenger cabins of airliners, buses and trains, and ships. Embodiments set forth in the claims also encompass all available equivalents of those claims.

Figure 1:
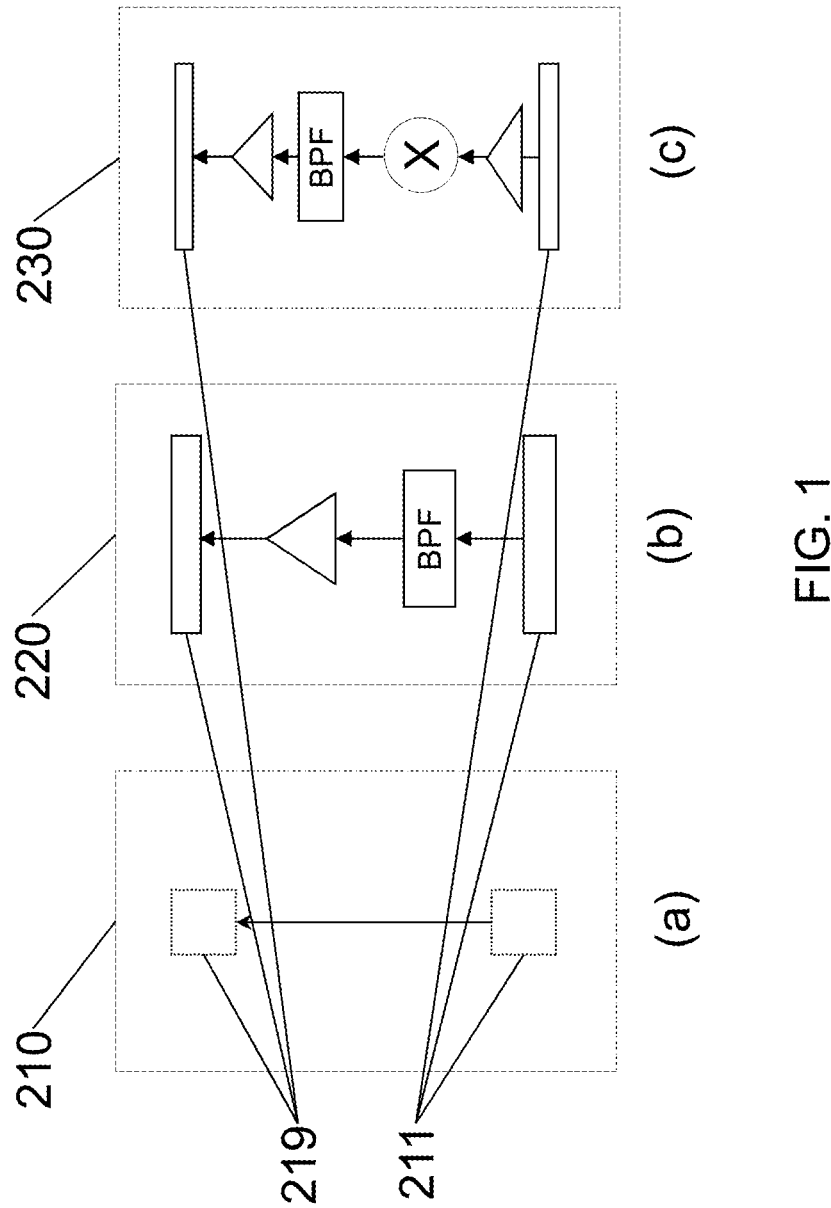
FIG. 1 illustrates (a) a symbol for active scattering devices with input and output elements connected, (b) an example of an RF repeater amplifier, and (c) an example of a transponder.

FIG. 1 depicted three single chain active scattering devices 210, 220 and 230, each of which features a receiving aperture 211 and a transmitting aperture 219 with a broad coverage. Many are near hemispherical coverage. The single chain active scatter 210 features an arrow line connecting the input aperture 211 and the output aperture 219, indicating signal received by the receiving aperture 211 from sources within its coverage will be sent to the transmitting aperture 219 for re-radiation. The coverage of the transmit aperture may or may not be identical to that of the receiving aperture. This block 210 will be used in this patent application to represent either the second scattering device 220 (a repeater) in some embodiments or the third scattering device 230 (a transponders or a transponding amplifier) in other embodiments.

The repeater 220 comprises of an input element or aperture 211, followed by a band pass filter (BPF), and an amplifier which is connected by a transmitting aperture 220.

The transponder 230 comprises of an input element or aperture 211, followed by a low noise amplifier, a frequency converter, band pass filter (BPF), and an amplifier which is connected by a transmitting aperture 219. The frequency of its input and that of its output are different.

The input elements of these active scattering devices are (internally) connected to their output elements accordingly.

Figure 2:
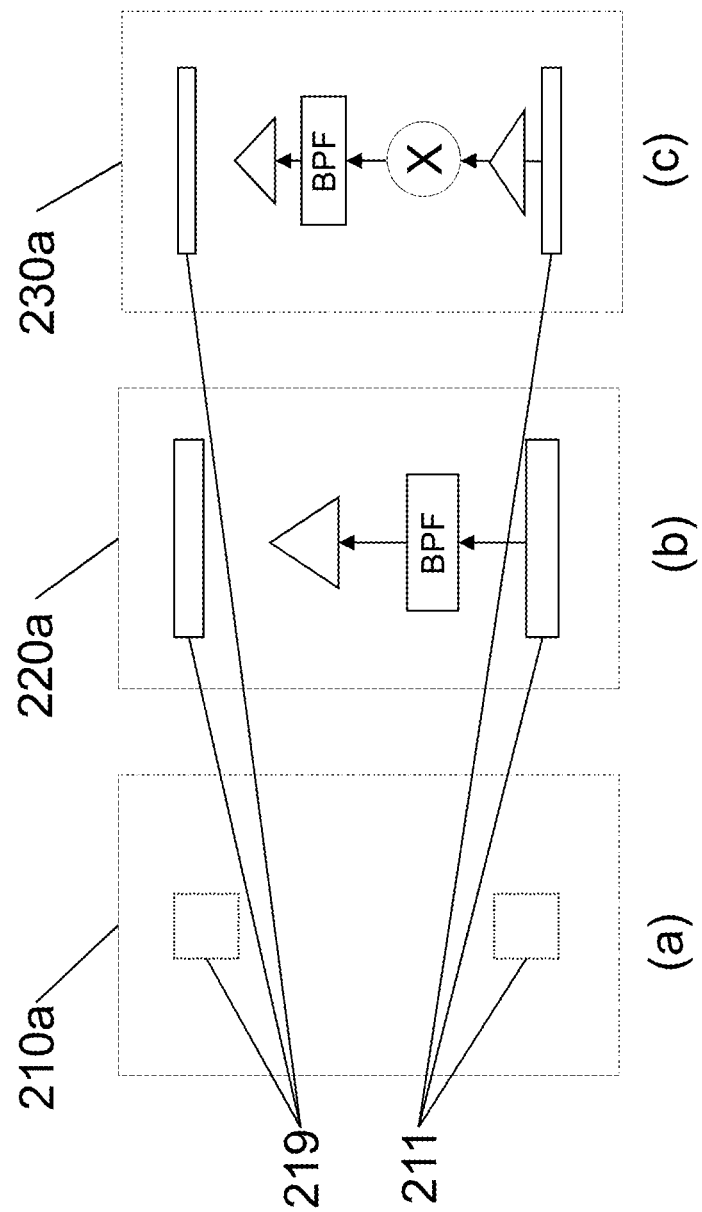
FIG. 2 illustrates (a) a symbol for active scattering devices with input and output elements disconnected to allow various connecting cable assemblies between inputs and outputs, and to support capability of multidimensional directional rotations between inputs and outputs elements, (b) an example of an RF repeater amplifier, and (c) an example of a transponder.

FIG. 2 depicted three active scattering devices 210a, 220a and 230a, each of which features a receiving aperture 211 and a transmitting aperture 219. The scattering device 210a features no arrow line connecting the input aperture 211 and the output aperture 219, indicating signal receive by the receiving aperture 211 will not be sent to the transmitting aperture 219 for re-radiation. Device 210a will be used to represent either the second active scattering device, a repeater 220a, in some embodiments or the third active scattering device, a transponder 230a, in other embodiments.

The repeater 220 comprises an input element or aperture 211, followed by a band pass filter (BPF), and an amplifier which is connected to a transmitting aperture 219. The transmitting aperture is separated from the rest of the assembly.

The transponder 230a comprises of an input element or aperture 211, followed by a low noise amplifier, a frequency converter, band pass filter (BPF), and an amplifier which is not connected by a transmitting aperture 219. The frequency of its input and that of its output are different.

We will be using the term "repeaters 210" to indicate active scattering devices 210a representing either repeaters 210b or transponder 210c hereafter.

The inputs and outputs of a repeater may operate in a same polarization, say a vertical polarization (VP) for both transmitting (Tx) and receiving (Rx) functions. A repeater may also operate in different linear polarizations: receive in vertical polarization (VP) but transmit in horizontal polarization (HP). Another set of repeaters may operate in different polarizations; receive in circular polarizations (CP) but transmit in linear polarizations (LP). Many examples are via radiating or reception elements with hemispherical coverage which can be replaced with elements with other coverage.

Embodiment 1 of Directional Repeater: Magic Mirrors

Figure 3:
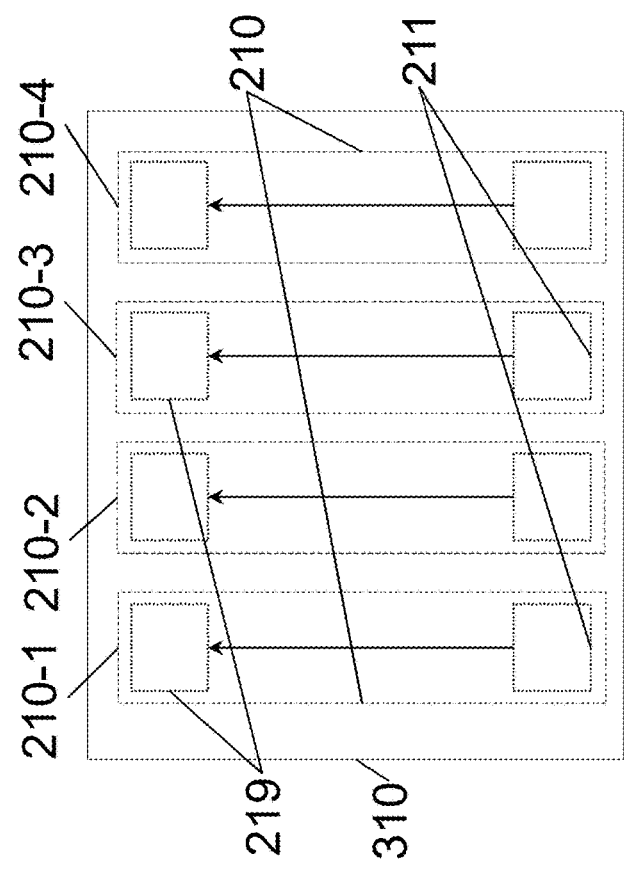
FIG. 3 depicts a geometry of arrays of repeaters/transponders, each to function as a magic mirror using amplifiers in space-fed array of repeaters/transponders. The scalable array with more repeaters/transponders becomes more directional as traffic grows.

In FIG. 3, a directional active scattering device 310 comprises multiple identical single chain repeaters 210 placed in parallel over an active area of a wall in a building. Beam forming mechanism among the single chain repeaters 210 are space-fed and highly dependent on physical geometry. The active scattering device 310 functions as cascaded receiving and transmitting arrays, but here are no physical interconnected among the constituting single-chain repeaters 210. It follows Snell's law, featuring 1-D active reflection with right-in and left-out and left-in and right-out. It is modular in design and support multiple users concurrently.

As a result, the width of the active area dictates resulting beam widths by an array comprising of the parallel single chain repeaters 210. The wider the active area occupied by the repeaters 210 the narrower the resulting beamwidths for both reception beams and re-radiation beams for the space fed array 310, which may also be referred to as the directional scattering device, or the directional repeater 310. The spacing between adjacent apertures will also determine whether there are grating lobes and where they are. For a given spacing, the space fed geometries will also feature frequency scanning characteristics.

The directional repeater 310 comprise of 4 parallel single-chain repeaters 210-1 to 210-4 with 4 input apertures 211 aligned horizontally and 4 output apertures 219 also aligned horizontally. Let us evaluate refection sequence of the directional repeater by a plane wave from far field. The plane wave features 2-D wavefronts. Suppose the directional repeater is placed on a flat surface with a surface normal in parallel to the direction of "out from the paper", and the incoming wavefront, perfectly aligned vertically, impinges on the repeater with an incident angle θ from the left (while facing the surface). The receiving aperture 211 of the first single chain repeater 210-1 shall capture an incoming wavefront first, while that of the fourth single chain repeater 210-4 shall capture an incoming wavefront last. Since the delays in all single chain repeaters are identical, the transmitting aperture 219 of the first repeater 210-1 will radiate the signal on the received wavefront first and the aperture 219 of the fourth repeater 210-4 will radiate the signal on the received wavefront last. As a result, a new wavefront radiated by the 4 radiating apertures 219 are generated which shall be propagating to an outgoing direction tilted θ to the right. In each repeater 210, the received signals are conditioned by an LNA followed by a BPF, and then amplified by an amplifier before radiated by an output aperture 219.

Figure 3A:
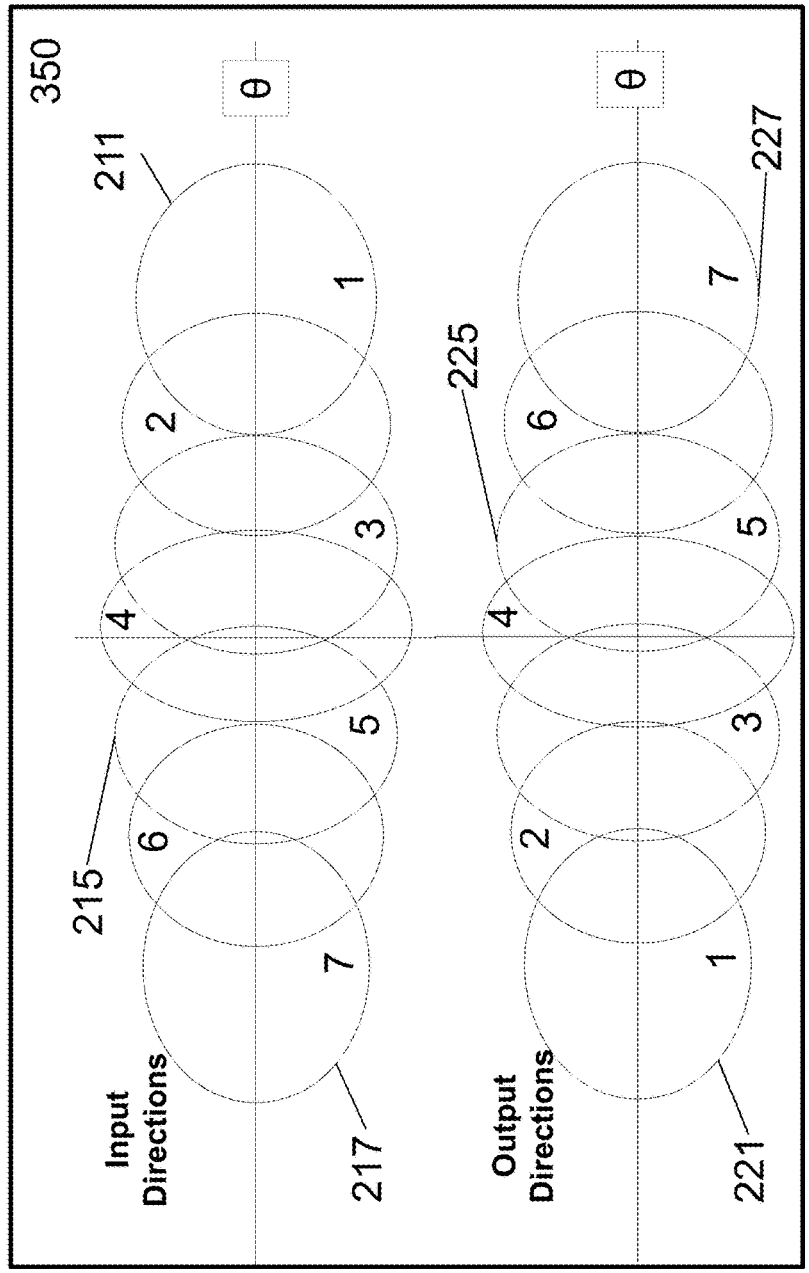
FIG. 3a depicts corresponding input and output beam patterns of the directional array of repeaters/transponders in FIG. 3.

FIG. 3a depicts array patterns 350 for receptions in an upper panel and for re-radiation in lower panel. They are typical 3-dB beam contour plots under assumptions of many parallel single chain amplifiers operating in narrowband concurrently. These repeaters are placed regularly with a spacing less than a half wavelength apart. There are 7 beam positions identified in both input directions and output directions as indicated. When a first signal stream in a first frequency is originated from a source at the center of the first input beam position 211, the corresponding amplified signals will appear over the coverage of the first output beam position 221. At the same time, when a second signal stream in a first frequency is originated from a source at the center of the fifth input beam position 215, the corresponding amplified signals will appear over the coverage of the fifth output beam position 225. Concurrently, when a third signal stream in a first frequency is originated from a source at the center of the seventh input beam position 217, the corresponding amplified signals will appear over the coverage of the seventh output beam position 227.

The space-fed beam forming for the directional repeaters shall feature continuous beam positions. We shall refer these directional repeaters 310 as 1-D magic mirrors.

Embodiment 2 of Directional Repeater: 1-D Retro-Directive

Figure 4:
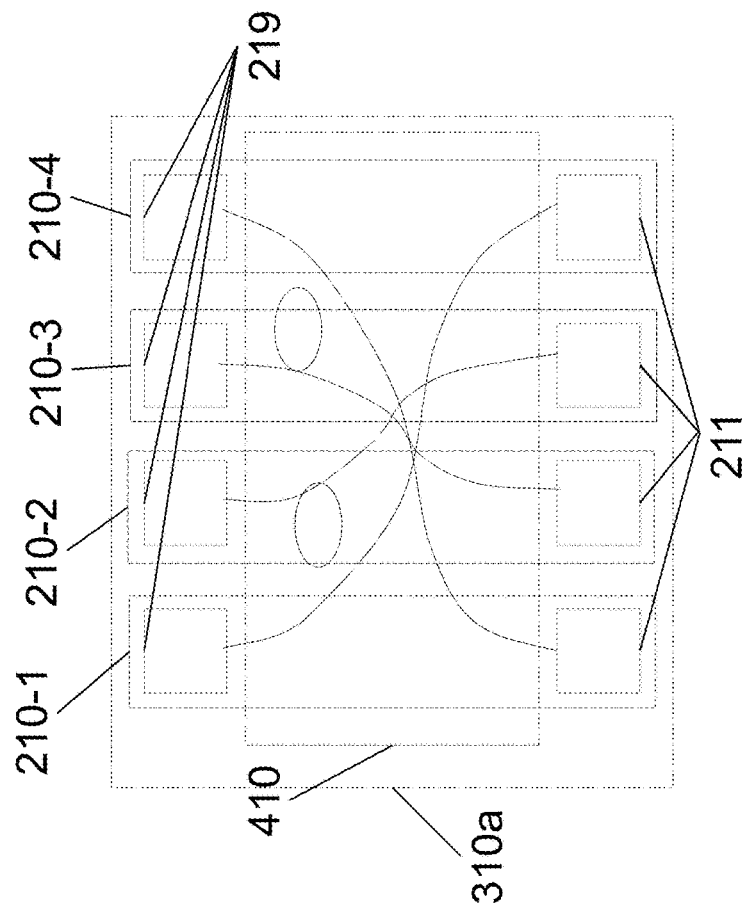
FIG. 4 depicts a geometry of directional arrays of repeaters/transponders, each to function as a 1-dimension retro-directive array using amplifiers in space-fed array of repeaters/transponders. The scalable array becomes more directional with more repeaters/transponders in the array as traffic grows.

Another embodiment of a directional repeater 310a is depicted in FIG. 4. A one-dimensional (1-D) directional repeater generally comprises multiple identical single chain repeaters placed in parallel over an active area on a wall or ceiling of a building. Beam forming mechanism among the single chain repeaters are space-fed and highly dependent on physical geometry. There are cross-over connections 410 physically interconnected among the constituting single-chain repeaters. As a result, the width of the active area dictates resulting beam widths by an array comprising of the parallel single chain repeaters. The wider the active area occupied by the repeaters the narrower the resulting beamwidths for both reception beams and radiation beams for the array. The spacing between adjacent apertures will also determine whether there are grating lobes and where they are. For a given spacing, the space fed geometries will also feature frequency scanning characteristics.

The depicted directional repeater 310a comprises of 4 parallel single-chain repeaters 210 with 4 input apertures 211 aligned horizontally and 4 output apertures 219 also aligned horizontally. Let us evaluate reflection sequence of the directional repeater by a plane wave from far field. The plane wave features 2-D wavefronts. Suppose the directional repeater is placed on a flat surface with a surface normal in parallel to the direction of "out from the paper", and the incoming wavefront, perfectly aligned vertically, impinges on the repeater with an incident angle θ from the left (while facing the surface). The receiving aperture 211 of the first single chain repeater 210-1, the left most, shall capture an incoming wavefront first, while that of the fourth single chain repeater 210-4, the right most, shall capture an incoming wavefront last.

There are cross-over connections 410 physically interconnected among the constituting single-chain repeaters 210 according to the following conditions.

The input element of the first repeater 210-1 (the left most) is connected to the output element of the last repeater 210-4 (the right most).

The input element of the second repeater 210-2 (the second left most) is connected to the output element of the second last repeater 210-3 (the second right most).

The input element of the third repeater 210-3 (the second right most) is connected to the output element of the second repeater 210-2 (the second left most).

The input element of the fourth, or the last, repeater 210-4 (the right most) is connected to the output element of the first repeater 210-1 (the left most).

Since the delays in all single chain repeaters 210 are identical and so are those in the interconnections, the transmitting aperture 219 of the first repeater 210-1 will radiate the signal on the received wavefront last and the aperture 219 of the fourth repeater 210-4 will radiate the signal on the received wavefront first. As a result, a new wavefront radiated by the 4 radiating apertures 219 are generated which shall be propagating to an outgoing direction tilted θ to the left, same as that of the propagating input wavefronts. This is the unique feature of retro-directivity. The retro-directional device 310a is a 1-D active scattering device and follows a corner reflector law, featuring a "right-in and right-out and left-in and left-out" propagation characteristics. It is modular in design and supports multiple users concurrently.

Figure 4A:
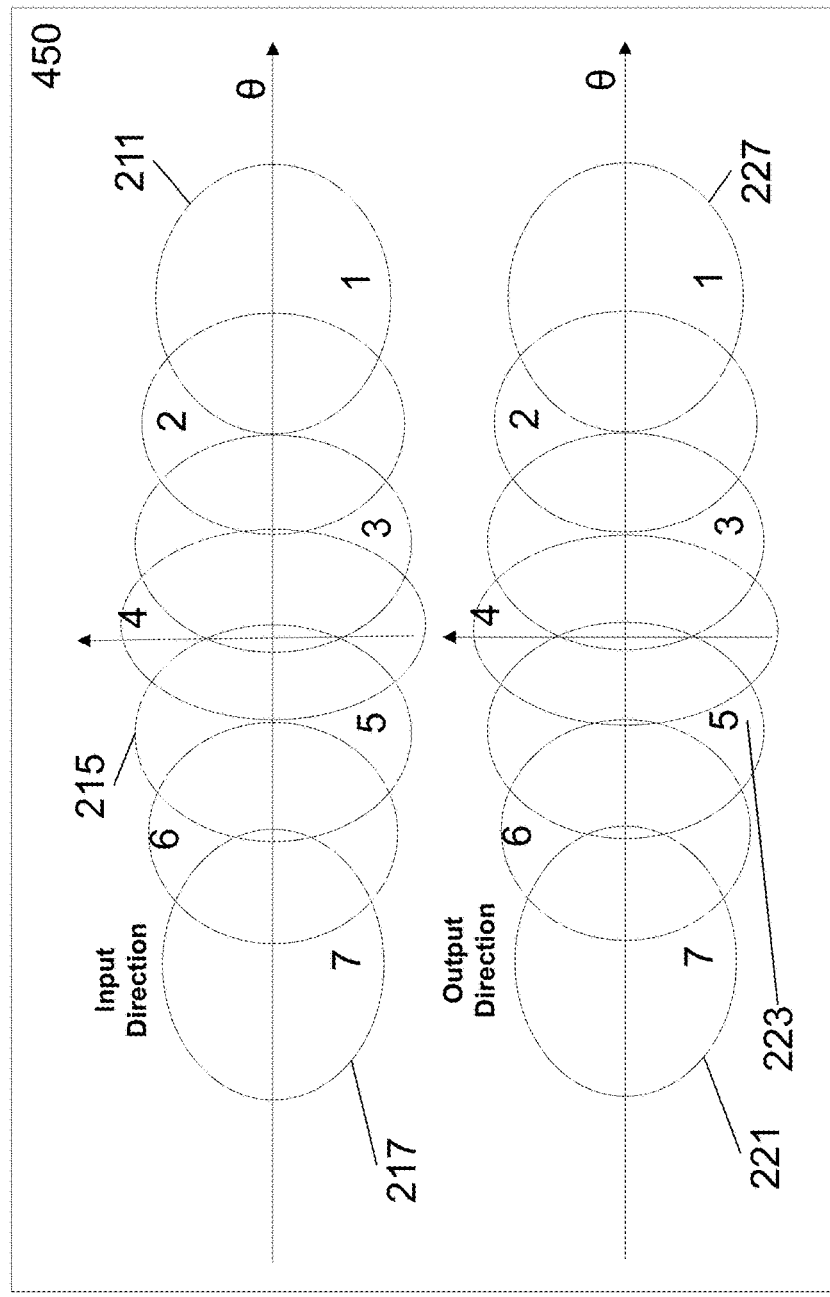
FIG. 4a depicts corresponding input and output beam patterns of the directional repeaters/transponders in FIG. 4.

FIG. 4a depicts array patterns 450 for receptions in an upper panel and for re-radiation in lower panel. They are typical 3-dB beam contour plots under assumptions of many parallel single chain amplifiers operating in narrowband concurrently. These repeaters are placed regularly with a spacing less than a half wavelength apart. There are 7 beam positions identified in both input directions and output directions as indicated. When a first signal stream in a first frequency is originated from a source at the center of the first input beam position 211, the corresponding amplified signals will appear over the coverage of the first output beam position 227. At the same time, when a second signal stream in a first frequency is originated from a source at the center of the fifth input beam position 215, the corresponding amplified signals will appear over the coverage of the fifth output beam position 223. Concurrently, when a third signal stream in a first frequency is originated from a source at the center of the seventh input beam position 217, the corresponding amplified signals will appear over the coverage of the seventh output beam position 221. The space-fed beam forming for the directional repeaters shall feature continuous beam positions with retro-directive features. We shall refer these directional repeaters as 1-D retro-directive, or retro-directional.

Embodiment 3 of Directional Repeater: 2-D Magic Panels

Figure 5:
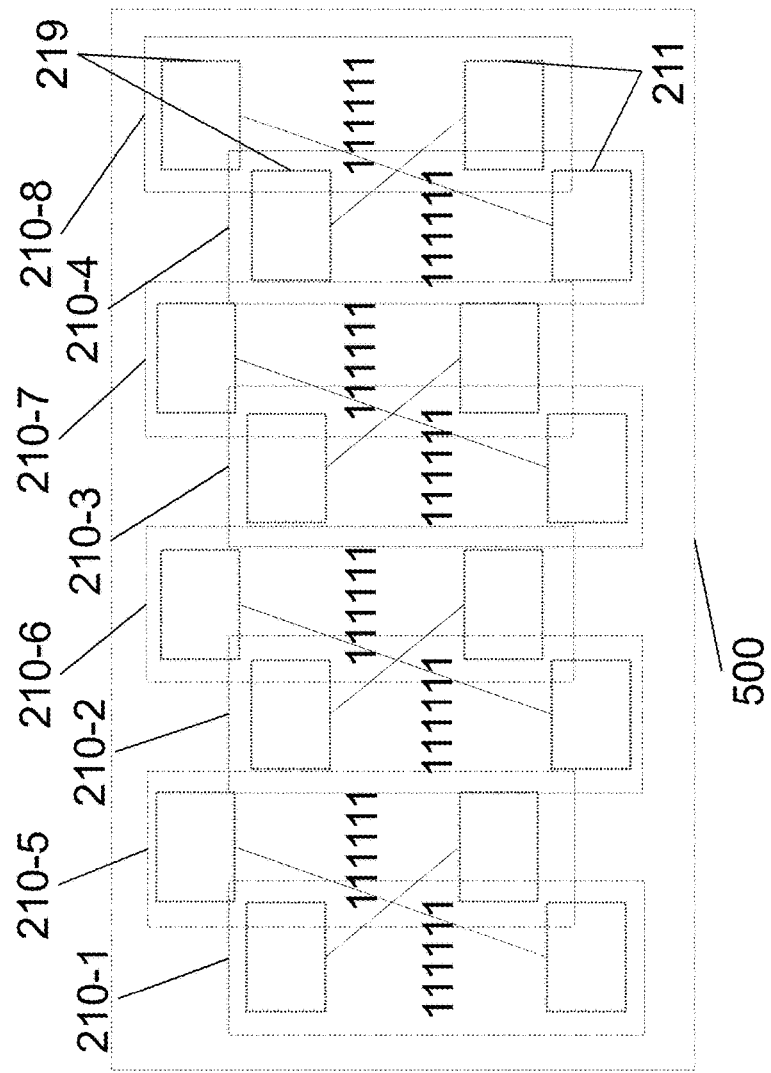
FIG. 5 depicts a 2-dimensional panels to function as an active mirror in a first dimension and as retro-directive array in a second dimension using space-fed arrays of amplifiers in an array of repeaters/transponders. The scalable array becomes more directional with more repeaters/transponders as traffic grows.

As depicted in FIG. 5, a two-dimensional (2-D) directional repeater 500 comprises multiple identical single chain repeaters placed in parallel over an active area. It is a modular design for multiple users concurrently. Beam forming mechanism among the single chain repeaters are space-fed and highly dependent on physical geometry. There are cross-over connections physically interconnected among the constituting single-chain repeaters. As a result, the directional repeaters function as active reflective mirrors following Snell's laws in one dimension, and become retro-directive in a perpendicular dimension. Furthermore, the width of the active area dictates resulting beam widths by an array comprising of the parallel single chain repeaters. The wider the active area occupied by the repeaters the narrower the resulting beamwidths for both reception beams and radiation beams for the array. The spacing between adjacent apertures will also determine whether there are grating lobes and where they are. For a given spacing, the space fed geometries will also feature frequency scanning characteristics.

The directional repeater 500 comprises of 8 parallel single-chain repeaters 210 with 8 input apertures 211 aligned horizontally in two lines. Their 8 output apertures 219 are also aligned horizontally in another two lines. Let us evaluate refection sequence of the directional repeater by a plane wave from far field. The plane wave features 2-D wavefronts. Suppose the directional repeater is placed on a flat surface with a surface normal in parallel to the direction of "out from the paper", and the incoming wavefront impinges on the repeater with an incident angle θ from the left (while facing the surface) horizontally and an incident angle ϕ from the top (while facing the surface) vertically. The receiving aperture 211 of the first subset of two repeaters 210-1 and 210-5, the left most, shall capture an incoming wavefront first, while that of the fourth subset of repeaters 210-4 and 210-8, the right most, shall capture an incoming wavefront last.

There are cross-over connections in each of the 4 subsets [(210-1, 210-5), (210-2, 210-6), (210-3, 210-7), (210-4, 210-8)], physically interconnecting the constituting two single-chain repeaters 210 in a subset.

The input element of the first repeater is connected to the output element of the second repeater.

The input element of the second repeater is connected to the output element of the first repeater.

Vertically, due to cross-interconnection between two single chain repeaters 210 in each of the 4 subset, the directional repeater 500 shall feature retro-directivity, same as the example in FIG. 4

Since the delays in all single chain repeaters 210 and the interconnections are identical, the transmitting aperture 219 of the first repeater subset (210-1, 210-5), the left most, will radiate the signal on the received wavefront first horizontally. Similarly, the apertures 219 of the fourth repeater subsets (210-4, 210-8), the right most, will radiate the signal on the received wavefront last. As a result, a new wavefront radiated by the 4 sets of radiating apertures 219 are generated which shall be propagating to an outgoing direction tilted θ to the right horizontally, following the Snell's laws.

Figure 5A:
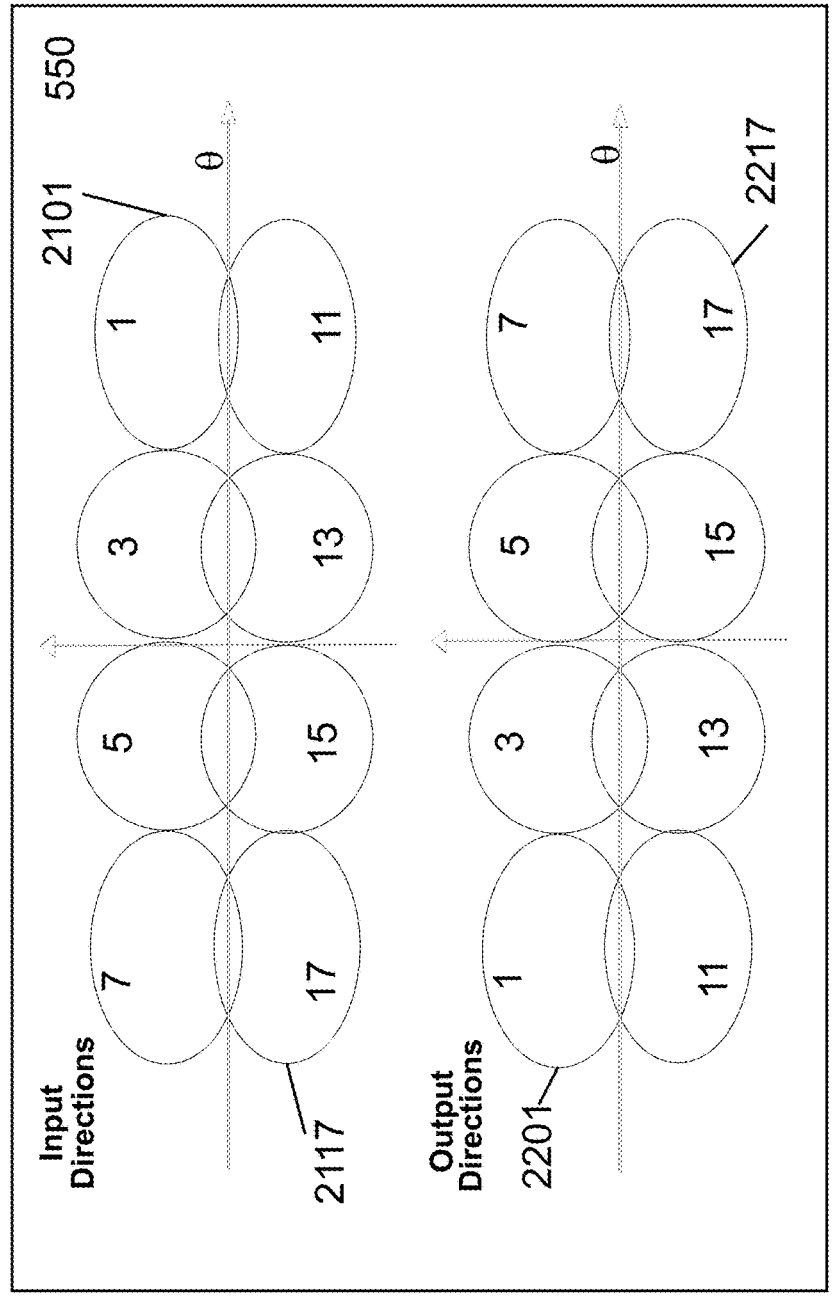
FIG. 5a depicts corresponding input and output beam patterns of a smart panel with the directional repeaters/transponders in FIG. 5.

FIG. 5a depicts array patterns 550 for receptions in an upper panel and for re-radiation in lower panel. They are typical 3-dB beam contour plots under assumptions of many parallel single chain amplifiers operating in narrowband concurrently. These repeaters are placed regularly with a spacing less than a half wavelength apart.

There are 8 beam positions in two dimensions identified in both input directions and output directions as indicated. When a first signal stream in a first frequency is originated from a source at the center of the first input beam position 2101, the corresponding amplified signals will appear over the coverage of the first output beam position 2201. At the same time, when a second signal stream in a first frequency is originated from a source at the center of the last input beam position 2117, the corresponding amplified signals will appear over the coverage of the last output beam position 2217.

The space-fed beam forming for the directional repeaters shall feature continuous beam positions with both reflective and retro-directive features in different directions. We shall refer these directional repeaters as 2-D magic panels.

Figure 6:
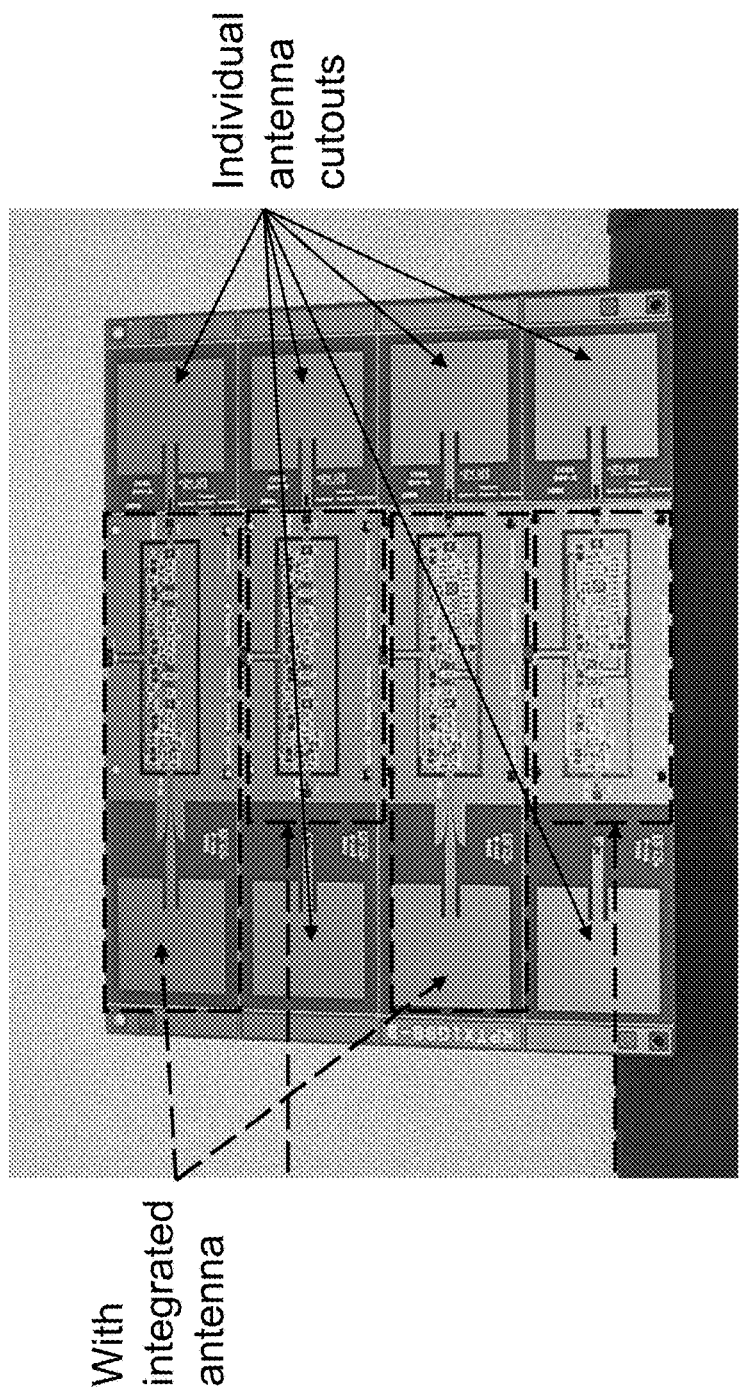
FIG. 6 depicts a breadboard of 2 sets of two element arrays, one for forward link and the other for return links in a cell phone band.

FIG. 6 depicts a photo of 4 single chain repeaters via printed circuit technologies. Conceivably the parallel single chain repeaters can be carried by mobile platforms in formations to function as directional repeaters of different kinds. Following similar arrangements in FIG. 3 and FIG. 4, 2-D mirror and 2-D retro-directive panels for RF signals can be configured and assembled via single chain repeaters depicted in FIG. 1 and FIG. 2. A picture of a FR-4 printed circuit board for 4 such repeaters is shown in FIG. 6. These repeaters were designed for 2.4 GHz.

In many other embodiments (not shown), one may use "propagation in free space" as beam forming mechanisms via multiple repeaters; placing them in various geometries or formations to achieve different desired directional performance. One such an example is to cover an L-shape indoor corridor by 4 parallel repeaters by altering geometries of each of the repeaters to have its input and output elements in 90° to one another physically.

Figure 7:
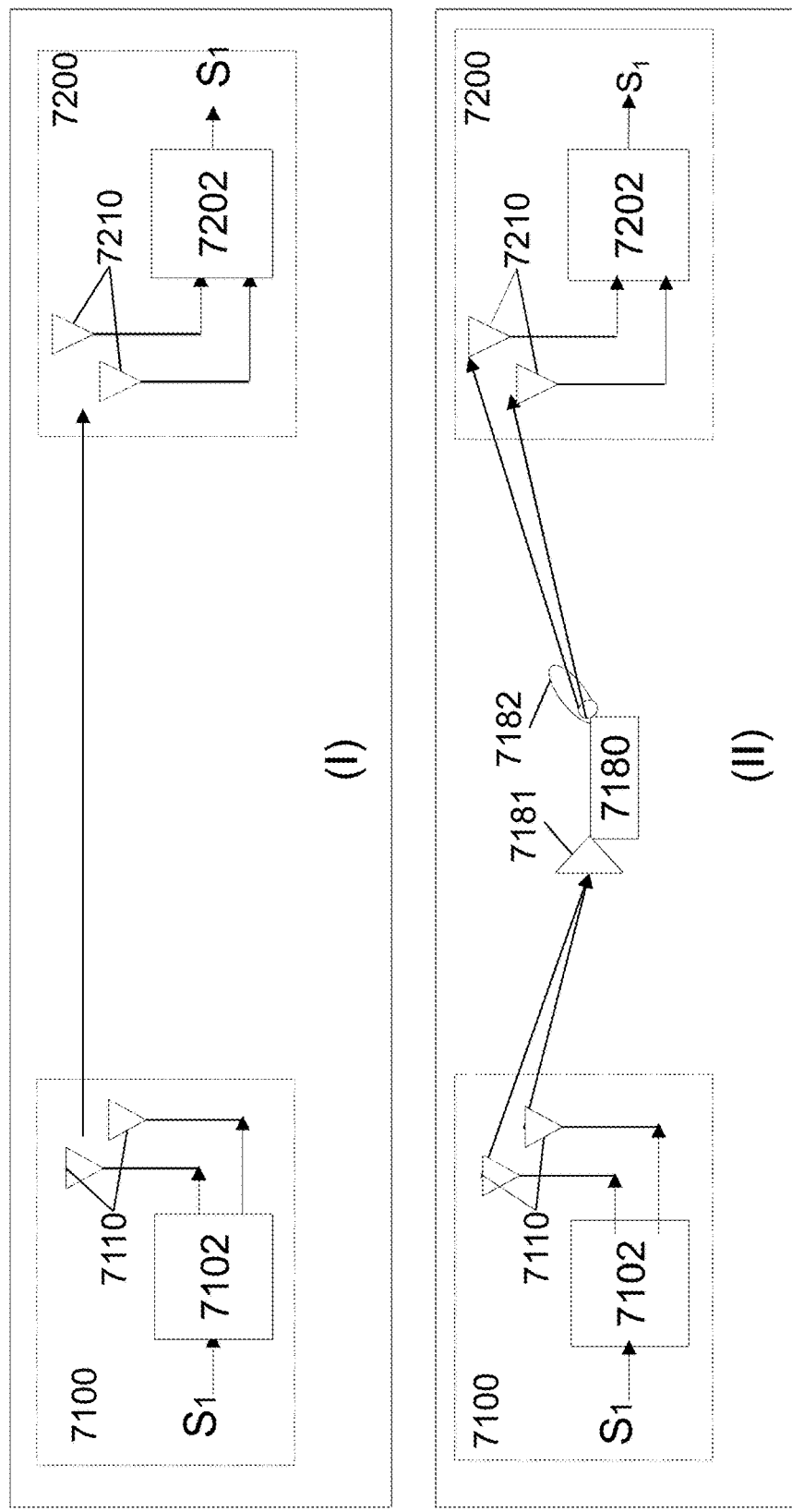
FIG. 7 depicts operation concepts on wireless communications between a transmitter and a receiver (I) without and (II) with a repeater.

FIG. 7 depicts a communication configurations between a transmitter 7100 and a receiver 7200 at a line-of sight distance: (I) without a repeater 7180 and (II) with a repeater

7180. There are two antenna elements 7110 fed by a beam forming network (BFN) 7102 in the transmitter 7100 and two antenna elements 7210 connected to a receiving BFN 7202 in the receiver 7200. In (I), without the repeater 7180, a single beam is formed at the transmitter 7100 and pointed to the receiver 7200 with a feature of a receiving beam pointed to the transmitter 7100. The channel bandwidth "BW" is for transporting signal $S_1$ from the transmitter 7100 in a source directly to the receiver 7200 in a destination. On the other hand, in (II), when an active repeater 7180 is placed in the propagation channel, the repeater 7180 shall pick up the S1 signal by a receiving antenna 7181, amplifying the captured signals that are then re-radiated by a transmitting antenna 7182 toward the destination. The channel bandwidth, via the active repeater, shall remain the same (still "B") for transporting signal $S_1$ from the transmitter 7100 in a source location to the receiver 7200 in the destination. We will use the configurations in FIG. 7 as references for bandwidth enhancement in a multipath propagation channel.

Figure 8:
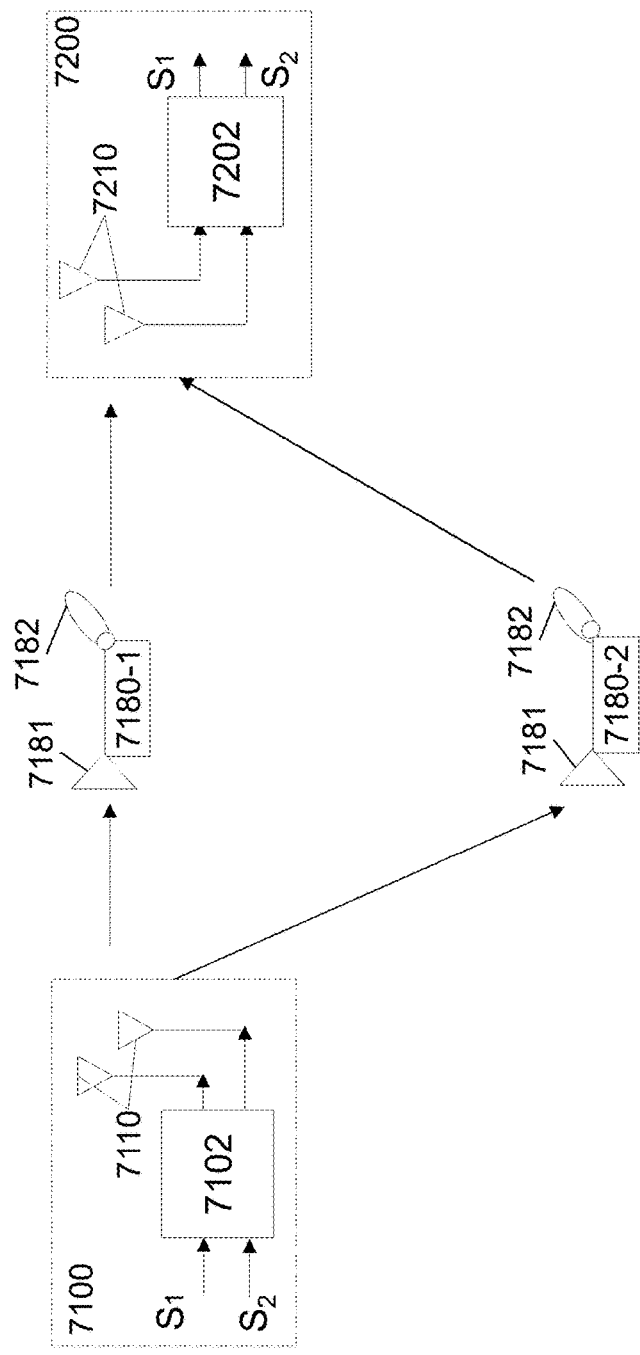
FIG. 8 depicts an operation concept on wireless communications between a transmitter and a receiver with two active scattering devices to double available channel bandwidths via multibeam arrays on both the transmitter and the receiver.

FIG. 8 depicts a communication configurations between a transmitter 7100 and a receiver 7200 via two separated active scattering devices or repeaters 7180. Power receptions at destinations are mainly aggregated fields re-radiated by the two active scattering devices.

As a result of the two active scattering devices 7180, the channel bandwidth is doubled by two concurrent propagation paths in a common frequency slot. Each is established with a channel bandwidth "BW" for transporting signals $S_1$ and $S_2$ from the transmitter 7100 in a source to the receiver 7200 in a destination.

Figure 8A:
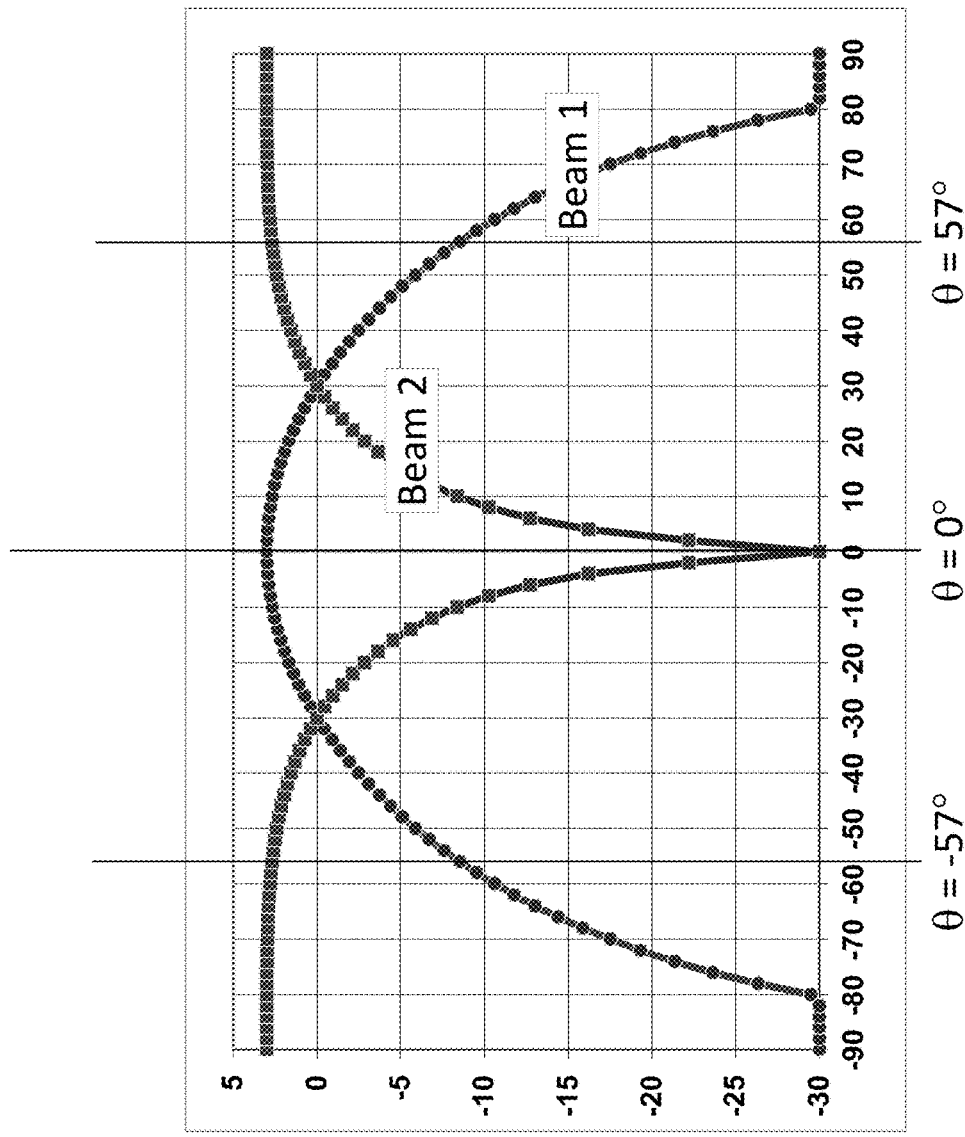
FIG. 8a depicts radiation patterns of two orthogonal beams by a 2 element array with element spacing of 0.5 wavelength via a 3-dB hybrid as a beam former.

The depicted configuration features conventional multi-beam antenna techniques in both the transmitter at the source and the receiver in the destination. The two transmitting antenna elements 7110 spaced apart only 0.5 wavelengths (6 cm at 2.5 GHz) are fed by a beam forming network (BFN) 7102 made from a Butler matrix in the transmitter 7100. Two concurrent orthogonal beams (OBs) are generated as depicted in FIG. 8a featuring simulated antenna gains in dB vs azimuth angle ($\theta$) in degrees:

A first OB beam with a beam peak at the boresite direction ($\theta=0°$) and nulls at the two end-fired directions ($\theta=\pm 90°$).

A second OB beam is formed with a null at the boresite direction ($\theta=0°$) and peaks at the two end-fired directions ($\theta=\pm 90°$).

Similarly, the two receiving antenna elements 7210 spaced apart only 0.5 wavelengths (6 cm at 2.5 GHz) are combined by a beam forming network (BFN) 7202 made from another Butler matrix in the receiver 7200. Two concurrent orthogonal beams (OBs) are generated also as depicted in FIG. 8a:

A first OB beam with a beam peak at the boresite direction ($\theta=0°$) and nulls at the two end-fired directions ($\theta=\pm 90°$).

A second OB beam is formed with a null at the boresite direction ($\theta=0°$) and peaks at the two end-fired directions ($\theta=\pm 90°$).

These repeater positions relative to the radiation patterns of both the transmitter and the receiver are indicated by 3 vertical lines in FIG. 8a.

As far as the transmitter is concerned, a first repeater is placed at the boresite, while the second repeater is placed at $\theta=57°$. It is clear that the first repeater 7180-1 is placed in a direction aligned with the peak of the first OB beam of the transmitter 7100 and second repeater 7180-2 is placed in a direction significantly off from the peak of the second OB beam of the transmitter 7100. In additions, the first repeater is in a null of the second OB beam while the second repeater is off significantly from a null of the first OB beam. As a result, the first repeater 7180-1 will only pick up a first input signals to the first OB beam and rejecting a second input signals to the second OB beam. Contrary, the second repeater 7180-2 will pick up not only the second input signals to the second OB beam and also leakages of the first input signals to the first OB beam.

At the transmitter, $S_1$ and $S_2$ are sent concurrently by respectively, a first and a second OB beams. As a result, the first repeater picks up $S_1$ only, and the second repeater capture both $S_2$ and $S_1$ in a form of $S_2+\Delta S_1$; where $\Delta S_1$ is the leakage amount from the first OB beam picked up by the second repeater which is slightly better than −10 dB isolation. The second repeater is at $\theta=57°$ but not at $\theta=\pm 90°$ which is one of the nulls of the first OB beam.

As far as the receiver is concerned, the first repeater is also at the boresite while the second repeater is placed at $\theta=-57°$. It is also clear that the first repeater 7180-1 is placed in a direction aligned with the peak of a first OB beam of the receiver 7200 and second repeater 7180-2 is placed in a direction significantly off from the peak of a second OB beam of the receiver 7200. In additions, the first repeater is in a null of the second OB beam while the second repeater is off significantly from a null of the first OB beam. As a result, the first OB beam in receiver will only pick up a first radiated signals from the first repeater 7180-1 and rejecting a second radiated signals to the second repeater 7180-2. Contrary, the second OB beam of the receiving beam former 7202 will pick up not only the second radiated signals from the second repeater 7180-2 and also leakages from the first radiated signals from the first repeater 7180-1.

At the receiver, $S_1$ sent via the first repeater is captured by a first OB beam, and $S_2+2\Delta S_1$ by a second OB beam concurrently. The $S_2+\Delta S_1$ sent by the second repeater is further contaminated by the leakage of $S_1$ signal from the first repeater but picked up by the second receiving OB beam at the destination. The leakage contaminations shall be better than −10 dB isolation, but not zero since the second repeater is not in one of the nulls of the first OB beam.

A pre-processing (not shown) in the transmitter 7100 may be implemented to compensate for the leakage of $S_1$ signals in the second repeater 7180 at 57°. Similarly a post processor (not shown either) in a receiver may be configured to completely separate S1 and S2.

Since two signal streams $S_1$ and $S_2$ are concurrently delivered via two active paths, the channel bandwidth (via two repeaters from a source to a destination) is doubled in comparison of that in FIG. 7.

Figure 8B:
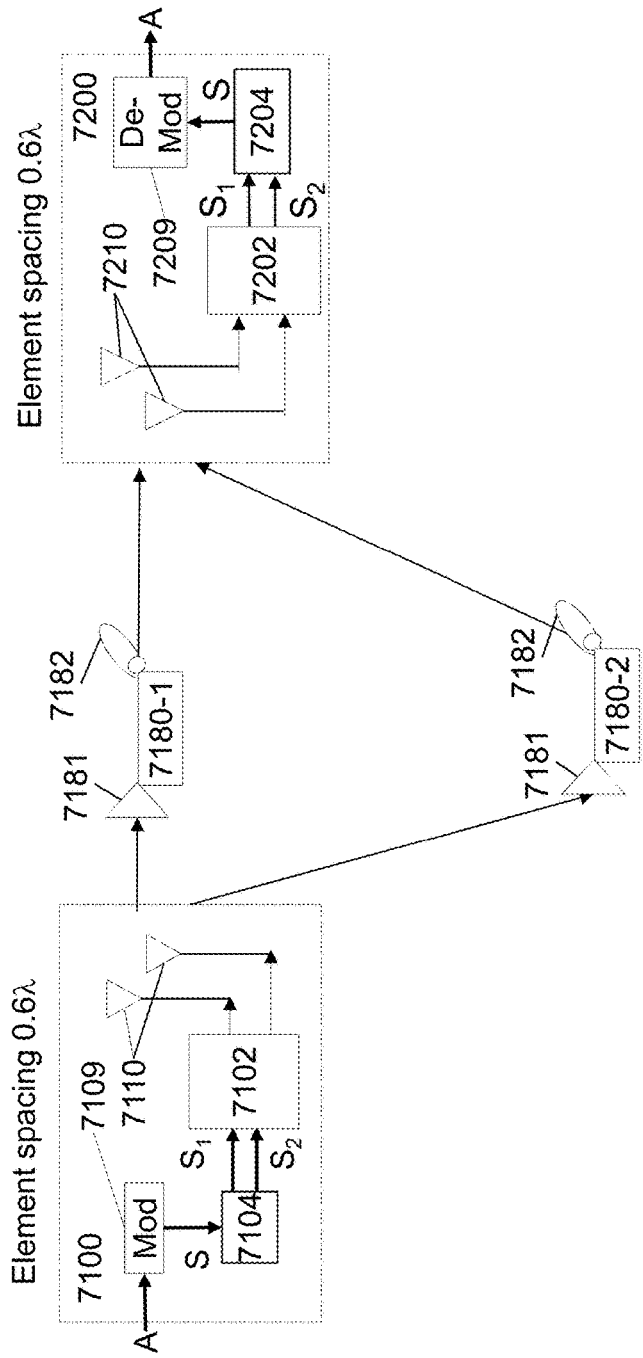
FIG. 8b depicts a second example on wireless communications between a transmitter and a receiver with two repeaters to double available channel bandwidths via multibeam arrays on both the transmitter and the receiver.
Figure 8C:
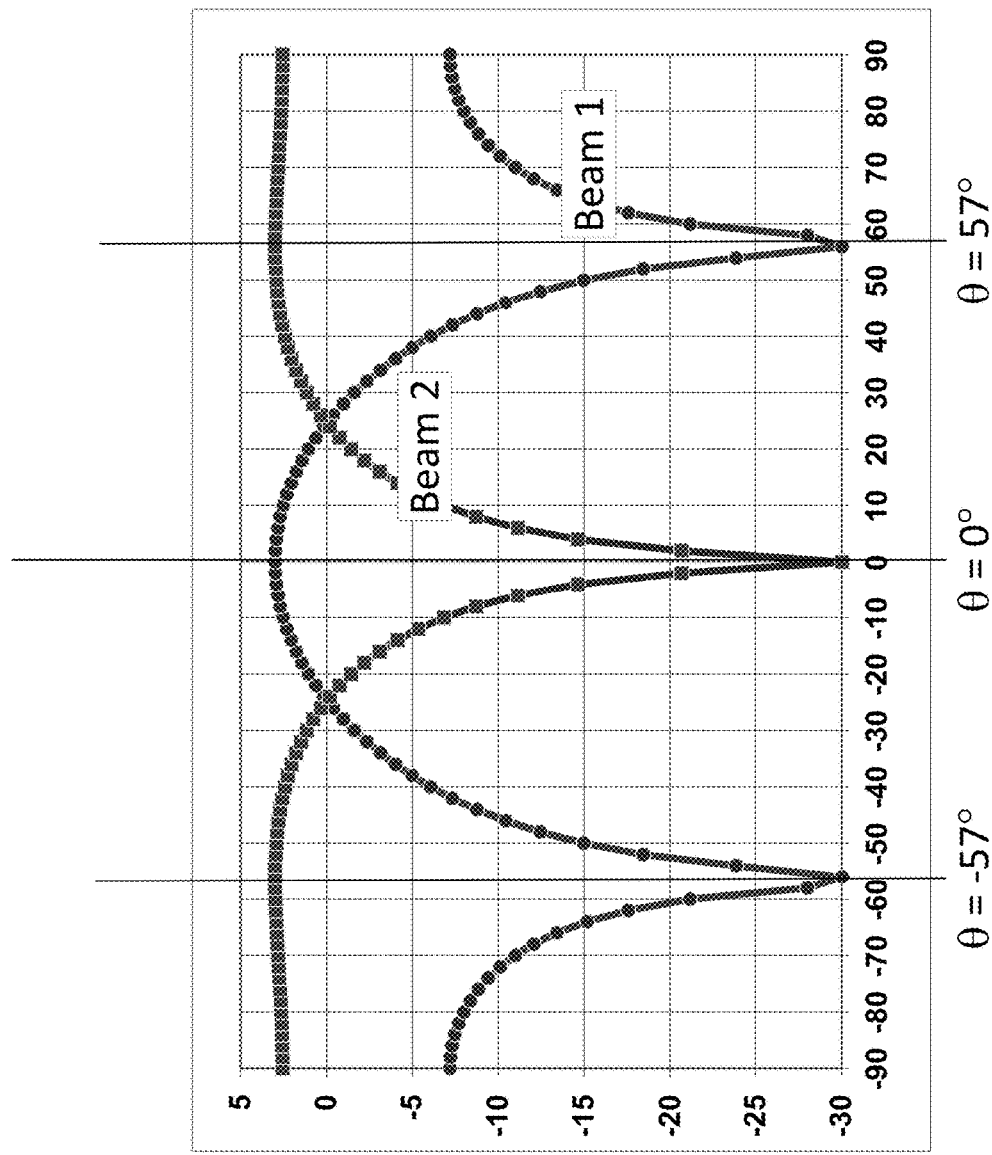
FIG. 8c depicts radiation patterns of two orthogonal beams via a 3-dB hybrid beam former for a 2 element array with element spacing of 0.6 wavelength.
Figure 8D:
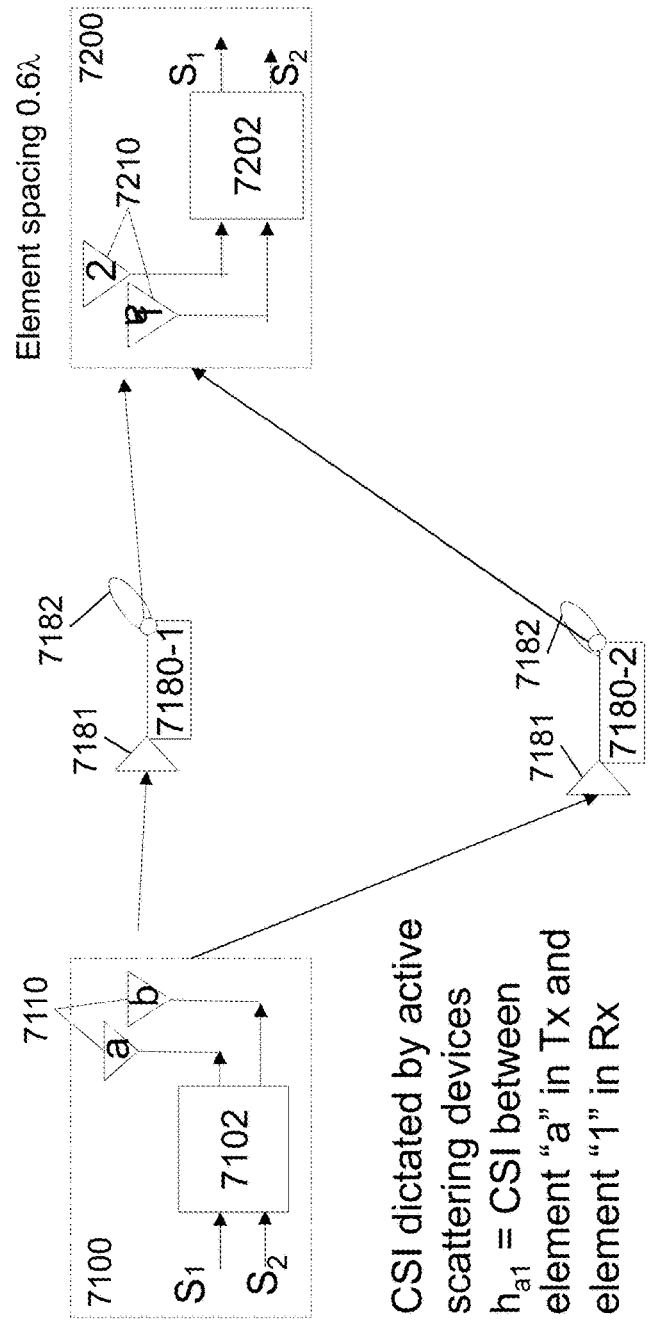
FIG. 8d depicts a third example on wireless communications between a transmitter and a receiver with two repeaters to double available channel bandwidths via multi-element arrays on both the transmitter and the receiver. The transmitter features a MIMO spatial processor and the receiver an OB beam former.
Figure 8E:
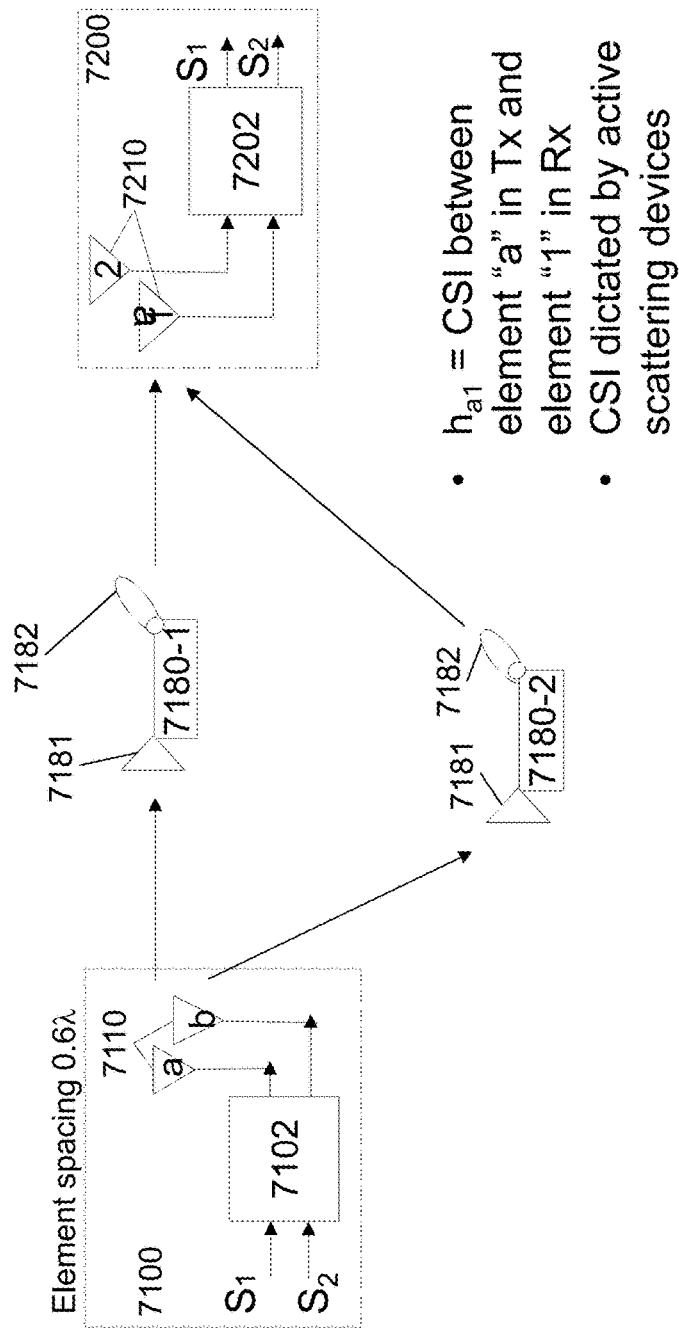
FIG. 8e depicts a $4^{th}$ example on wireless communications between a transmitter and a receiver with two repeaters to double available channel bandwidths via multi-element arrays on both the transmitter and the receiver. The transmitter features an OB beam former and the receiver a MIMO spatial processor.
Figure 8F:
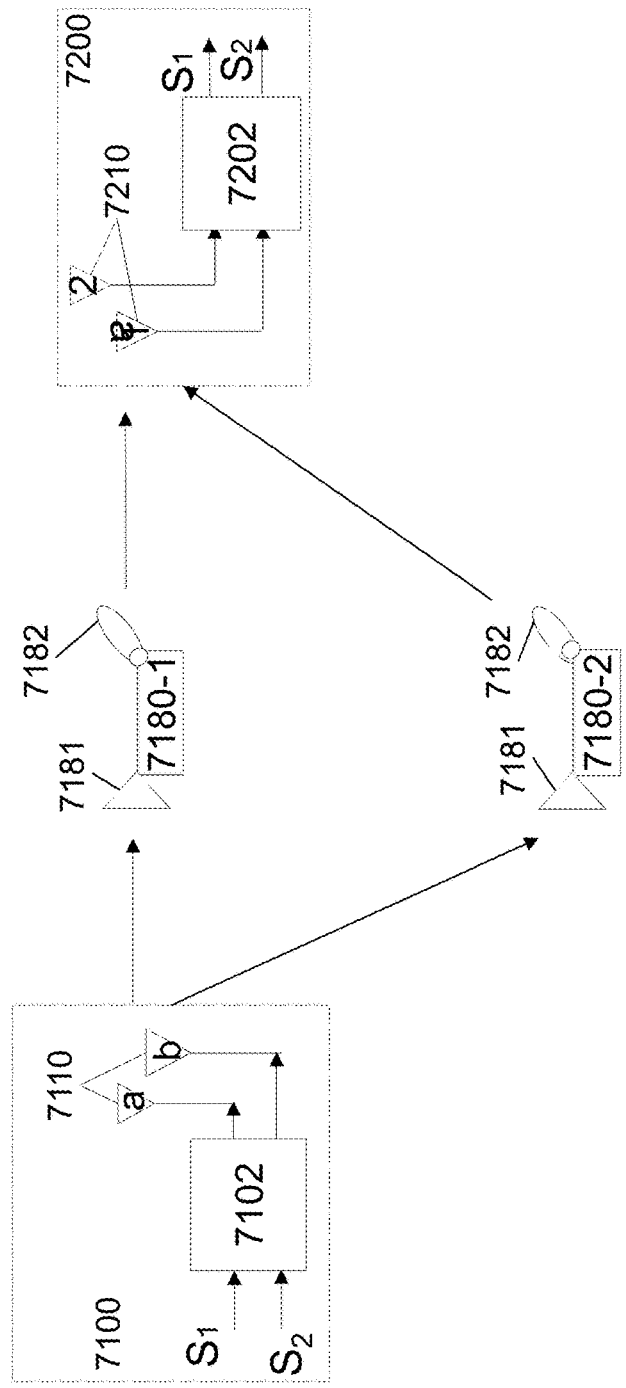
FIG. 8f depicts a $5^{th}$ example on wireless communications between a transmitter and a receiver with two repeaters to double available channel bandwidths via multi-element arrays on both the transmitter and the receiver. Both the transmitter and the receiver feature MIMO spatial processors.

Four additional embodiments with two active scattering devices in a propagation channel with different spatial processing will be depicted, respectively, in FIG. 8b, FIG. 8d, FIG. 8e, and FIG. 8f. FIG. 8b features OB beams in both a transmitting (Tx) source and receiving (Rx) destinations. FIG. 8d features MIMO in a transmitting (Tx) source and OB beams in receiving (Rx) destinations. FIG. 8e features OB beams in a transmitting (Tx) source and MIMO in receiving (Rx) destinations. FIG. 8f features MIMO in both a transmitting (Tx) source and receiving (Rx) destinations. The two active scattering devices 7180-1 and 7180-2 in FIG. 8b, FIG. 8d, and FIG. 8d, are placed at a peak of one OB beam and a null at the other OB beams. In FIG. 8f, the MIMO configuration features array element spacing>0.4 wavelength in air; or equivalent.

FIG. 8b depicts a second communication configuration between a transmitter 7100 and a receiver 7200 via two separated active scattering devices or repeaters 7180 (7180-1 and 7180-2). The only difference between this one and the configuration in FIG. 8 is the element spacing between the two antenna elements 7210 in the receiver 7200, which is increased to 0.6 wavelengths (or 7.2 cm at 2.5 GHz). So is that for the transmitter elements 7110. As a result, the active scattering devices are respectively, at peaks of two OB beams in transmit (Tx). In addition, they are also, respectively, in the directions of peaks of two receiving OB beams. The two active scattering devices will also double the channel bandwidth via two concurrent propagation paths in a common frequency slot. Each is established with a channel bandwidth "BW" for transporting signals $S_1$ and $S_2$ from the transmitter 7100 in a source to the receiver 7200 in a destination.

The configuration features conventional multi-beam antenna techniques in both the transmitter at the source and the receiver in the destination. But, the two transmitting antenna elements 7110 are spaced apart by 0.6 wavelengths (7.2 cm at 2.5 GHz), which are fed by a beam forming network (BFN) 7102 made from a Butler matrix in the transmitter 7100. Two concurrent orthogonal beams (OBs) are generated as depicted in FIG. 8c:

A first OB beam with a beam peak at the boresite direction ($\theta=0°$) and nulls at the two directions ($\theta=\pm57°$).

A second OB beam is formed with a null at the boresite direction ($\theta=0°$) and peaks at the two directions ($\theta=\pm57°$).

As depicted the input data stream A is to be sent to a destination via the wireless system. The data stream, A, is modulated by a modulator 7109 and becomes a signal stream, S, which is divided into two signal substreams $S_1$ and $S_2$ result by a splitter 7104. These signal substreams $S_1$ and $S_2$ are fed to a two-beam beam-forming-network (BFN) 7102 with two outputs which are amplified and radiated by two elements 7110. The BFN is implemented in a 2-to-2 Butler matrix.

As far as the transmitter is concerned, a first repeater is placed at the boresite, while the second repeater is placed at $\theta=57°$. As a result, only $S_1$ will be radiated toward the first repeater 7180-1 at the boresite, and only $S_2$ toward the second repeater 7180-2. There is no leakage from the first OB beam picked up by the second repeater nor is that from the second OB beam picked up by the first repeater. Each repeater is placed at a peak of an OB beam and in a null of the other OB beam.

Similarly, the two receiving antenna elements 7210 spaced apart only 0.6 wavelengths (7.2 cm at 2.5 GHz) are combined by a beam forming network (BFN) 7202 made from another Butler matrix in the receiver 7200. Two concurrent orthogonal beams (OBs) are generated;

A first OB beam with a beam peak at the boresite direction ($\theta=0°$) and nulls at the two end-fired directions ($\theta=\pm57°$).

A second OB beam is formed with a null at the boresite direction ($\theta=0°$) and peaks at the two end-fired directions ($\theta=\pm57°$).

As far as the receiver is concerned, the first repeater is also at the boresite while the second repeater is placed at $\theta=-57°$.

At the receiver, $S_1$ sent via the first repeater is captured by a first OB beam, and $S_2$ by a second OB beam concurrently. The $S_2$ sent via the second repeater will not be contaminated by any leakage of $S_1$ signal from the first repeater which is in a null of the second receiving OB beam at the destination.

Since two signal streams $S_1$ and $S_2$ are concurrently delivered via two active paths, the channel bandwidth (via two repeaters from a source to a destination) is doubled in comparison of that in FIG. 7. The recovered signal substreams $S_1$ and $S_2$ are combined via 7204 into a signal stream, S, before converted by a demodulator 7209 to a recovered data stream A.

FIG. 8d also depicts another embodiment of a communication configuration between a transmitter 7100 and a receiver 7200 via two separated active scattering devices or repeaters 7180 (7180-1 and 7180-2). The only difference from FIG. 8b is that the spatial processor 7102 in transmitter 7100 features a MIMO Tx processor, which comprises functions of measuring current channel state information (CSI). In addition, the spatial processor 7102 will perform the following operation;

$$S_a = w_{a1}S_1 + w_{a2}S_2 \quad (1a)$$

$$S_b = w_{b1}S_1 + w_{b2}S_2 \quad (1b)$$

where the weighing vector [$w_{a1}$, $w_{a2}$, $w_{b1}$, $w_{b2}$] is continuously optimized to meet specified performance constraints.

The performance constraints are to assure the $S_1$ and $S_2$ are separately appearing at the two outputs of the Rx OB beam former 7202 in the receiver 7200.

The two receiving antenna elements 7210 spaced apart only 0.6 wavelengths (7.2 cm at 2.5 GHz) are combined by a beam forming network (BFN) 7202 made from a 2-to-2 Butler matrix in the receiver 7200. Two concurrent orthogonal beams (OBs) are generated:

A first OB beam with a beam peak at the boresite direction ($\theta=0°$) and nulls at the two end-fired directions ($\theta=\pm57°$).

A second OB beam is formed with a null at the boresite direction ($\theta=0°$) and peaks at the two end-fired directions ($\theta=\pm57°$).

The repeaters are placed at the same locations as those in FIG. 8b, in which a first repeater is placed at the boresite, while the second repeater is placed at $\theta=-57°$ with respect to the receiver. Re-radiated signals from the two repeaters 7180-1 and 7180-2 are formulated as follows;

$$S_{s1} = Aa_1S_a + A_{b1}S_b = C_{11}S_1 + C_{12}S_2 \quad (2a)$$

$$S_{s2} = A_{a2}S_a + A_{b2}S_b = C_{21}S_1 + C_{22}S_2 \quad (2b)$$

The spatial processor 7202 shall feature an optimization scheme which iteratively alters the weighting vector in equations (1) until it leads to a result of $C_{12}=C_{21}=0$ in equations (2). As a result, the first and second repeaters 7180-1 and 7180-2 will, respectively, have amplified $S_1$ and $S_2$ outputs for re-radiations individually:

$$S_{s1} = Aa_1S_a + A_{b1}S_b = C_{11}S_1 \quad (3a)$$

$$S_{s2} = Aa_2S_a + A_{b2}S_b = C_{22}S_2 \quad (3b)$$

Consequently, the OB beam former 7202 of the receiver 7200 will feature the $S_1$ signals in a first output port and the $S_2$ signal in a second output port concurrently.

In a third embodiment, the repeaters 7180 are placed not at the same locations as those in FIG. 8b, in which a first repeater 7180-1 is placed at the boresite, while the second repeater 7180-2 is placed at $\theta=57°$ with respect to the transmitter. As long as they are placed far apart in angles, say 30°, and within field of views (FOVs) of all individual elements from both transmitter and the receiver. The FOVs may include none line-of-sight regions. The two outputs of the OB beam former 7202 shall be formulated as $$S'_1 = D_{11}S_{s1} + D_{12}S_{s2} = G_{11}S_1 + G_{12}S_2 \quad (4a)$$

$$S'_2 = D_{21}S_{s1} + D_{22}S_{s2} = G_{21}S_1 + G_{22}S_2 \quad (4b)$$

The spatial processor 7102 shall feature an optimization scheme which iteratively alters the weighting vector in equations (1) until it leads to a result of $G_{12}=G_{21}=0$ in equations (4). As a result, the first and second repeaters 7180-1 and 7180-2 will, respectively, have amplified $S_1$ and $S_2$ outputs for re-radiations individually, and $$S'_1 = D_{11}S_{s1} + D_{12}S_{s2} = G_{11}S_1 \tag{5a}$$

$$S'_2 = D_{21}S_{s1} + D_{22}S_{s2} = G_{22}S_2 \tag{5b}$$

Since two signal streams $S_1$ and $S_2$ are concurrently delivered via two active paths, the channel bandwidth (via two repeaters from a source to a destination) is doubled in comparison of that in FIG. 7.

FIG. 8e depicts another embodiment for the communication configuration between a transmitter 7100 and a receiver 7200 via two separated active scattering devices or repeaters 7180 (7180-1 and 7180-2). The main difference of this one from the configuration in FIG. 8b is that the spatial processor 7202 in receiver 7200 features a MIMO Rx processor, which comprises functions of measuring current channel state information (CSI).

The two transmitting antenna elements 7110 spaced apart only 0.6 wavelengths (7.2 cm at 2.5 GHz) are fed by a beam forming network (BFN) 7102 made from a 2-to-2 Butler matrix in the transmitter 7100. Two concurrent orthogonal beams (OBs) are generated:

A first OB beam with a beam peak at the boresite direction ($\theta=0°$) and nulls at the two end-fired directions ($\theta=\pm57°$).

A second OB beam is formed with a null at the boresite direction ($\theta=0°$) and peaks at the two end-fired directions ($\theta=\pm57°$).

The repeaters are placed at the same locations as those in FIG. 8b, in which a first repeater is placed at the boresite, while the second repeater is placed at $\theta=57°$ with respect to the transmitter. Re-radiated signals are amplified $S_1$ from the first repeater 7180-1 and amplified $S_2$ signals from the second repeater 7180-2 respectively.

The two receiving element 7210 will capture re-radiated signals from both repeaters 7180 (7180-1 and 7180-2), and the spatial processor 7202 will perform the following operation:

$$S'_1 = w_{11}S_1 + w_{12}S_2, \tag{6a}$$

$$S'_2 = w_{21}S_1 + w_{22}S_2, \tag{6b}$$

where the weighing vector [$w_{11}$, $w_{12}$, $w_{21}$, $w_{22}$] is continuously optimized to meet specified performance constraints.

As depicted, the 7202 in the receiver 7200 is not an Rx beam forming network but a MIMO post-processor. Channel state information (CSI) is dictated by active scattering devices 7180-1 and 7180-2 in which a first repeater is placed at the boresite, while the second repeater is placed at $\theta=+57°$ with respect to the transmitter. The MIMO post processor 7202 on a destination will be continuously calibrated and updated iteratively until receiving signals $S_1$ and $S_2$ at the outputs of the MIMO post processor 7202 become separated.

The spatial processor 7202 may feature an optimization scheme which iteratively alters the weighting vector in equations (6) until it leads to a result of $w_{12}=w_{21}=0$. The performance constraints are to assure the $S_1$ and $S_2$ are separately appearing at the two outputs of the Rx spatial processor 7202 in the receiver 7200. The outputs of the receiving MIMO processor 7202 feature S'1 and S'2, where $$S'_1 = w_{11}S_1 \tag{7a}$$

$$S'_2 = w_{22}S_2. \tag{7b}$$

Since two signal streams $S_1$ and $S_2$ are concurrently delivered via two active paths from the source 7100 to the destination 7200, the channel bandwidth (via two repeaters) is doubled in comparison of that in FIG. 7.

FIG. 8f depicts a fifth communication configuration between a transmitter 7100 and a receiver 7200 via two separated active scattering devices or repeaters 7180 (7180-1 and 7180-2). The only difference between this one and the configuration in FIG. 8b are (1) the Tx spatial processor 7102 in the transmitter 7100 and the spatial processor 7202 in receiver 7200 are MIMO processing, which comprises functions of measuring current channel state information (CSI). The two transmitting antenna elements 7110 spaced apart more than 0.4 wavelengths (4.8 cm at 2.5 GHz) are fed by the spatial processor 7102 in the transmitter 7100.

The repeaters are placed at the same locations as those in FIG. 8b, in which a first repeater is placed at the boresite, while the second repeater is placed at $\theta=\pm57°$ with respect to the transmitter. Re-radiated signals from the two repeaters 7180-1 and 7180-2 are two different linear combinations of amplified $S_1$ and $S_2$ signals respectively.

Power received by a receiving element is an aggregated RF field in free space mainly from re-radiation by the active scattering devices. The free space radiated power distributed in space are controllable or "shapeable" by radiation patterns of a transmitter and positions and orientations of distributed active devices. Power density distribution in space around any one element of a receiving array is not controllable. However, multiple closely spaced receiving elements of a receiver are able to separate re-radiated signals from various active scattering devices which are sparsely distributed. An antenna with two Rx elements even with a 0.5 wavelength separation can be designed to separate two independent signals in a common frequency slot from two different incoming directions with 60° spacing (with or without Butler matrix).

The two receiving element 7210 will capture re-radiated signals from both repeaters 7180 (7180-1 and 7180-2), and the spatial processor 7202 will perform the following operation:

$$S'_1 = w_{11}S_1 + w_{12}S_2, \tag{8a}$$

$$S'_2 = w_{21}S_1 + w_{22}S_2, \tag{8b}$$

where the weighing vector [$w_{11}$, $w_{12}$, $w_{21}$, $w_{22}$] is continuously optimized to meet specified performance constraints.

In addition, the spatial processor 7202 features an optimization scheme which iteratively alters the weighting vector in equations (8) until it leads to a result of $w_{12}=w_{21}=0$. The performance constraints are to assure the $S_1$ and $S_2$ are separately appearing at the two outputs of the Rx spatial processor 7202 in the receiver 7200.

As a result, the first and second repeaters 7180-1 and 7180-2 will, respectively, have amplified $S_1$ and $S_2$ outputs for re-radiations individually:

$$S'_1 = w_{11}S_1 \tag{9a}$$

$$S'_2 = w_{22}S_2 \tag{9b}$$

Since two signal streams $S_1$ and $S_2$ are concurrently delivered via two active paths from a source 7100 to a destination 7200, the channel bandwidth (via two repeaters) is doubled in comparison of that in FIG. 7.

Figure 9:
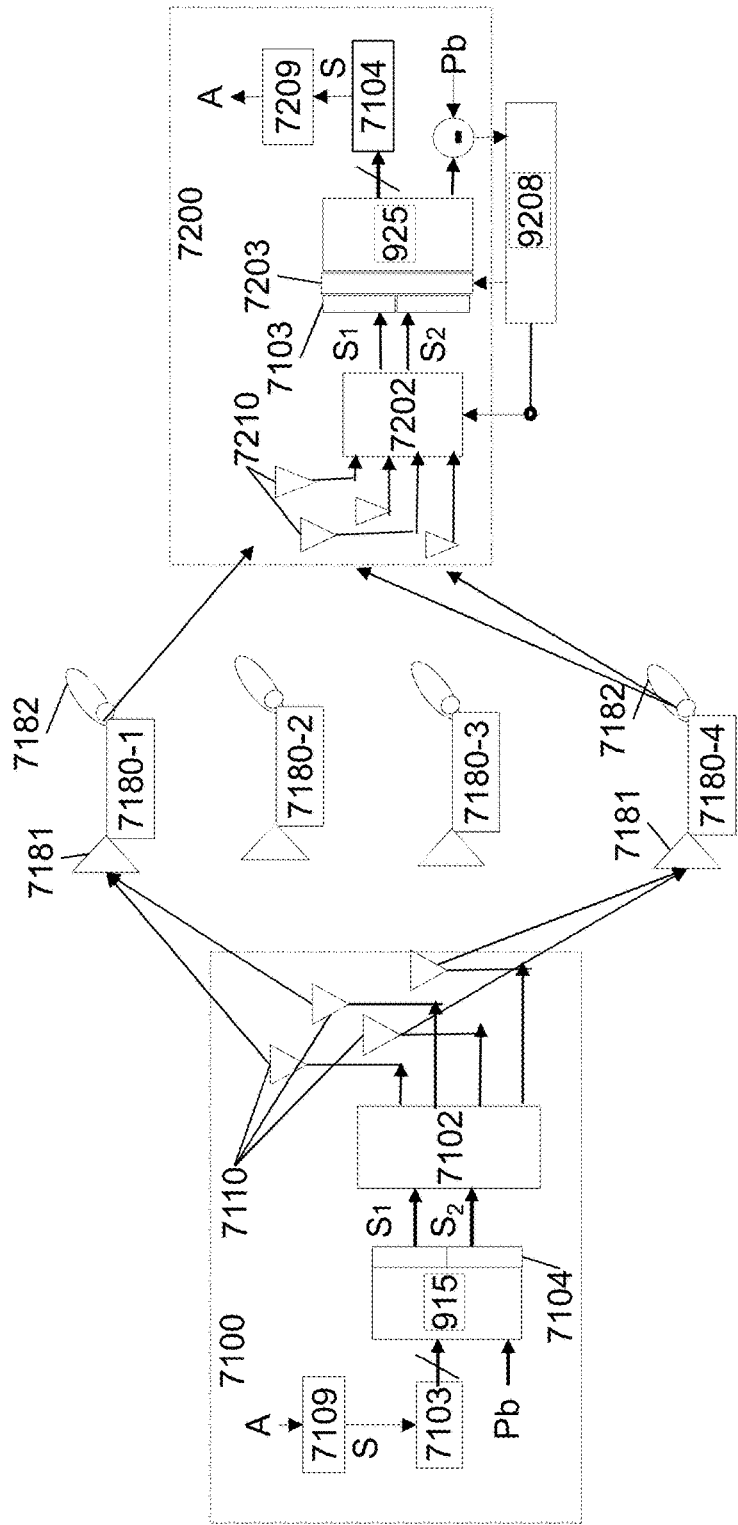
FIG. 9 depicts an example on wireless communications via wavefront multiplexing/demultiplexing between a transmitter and a receiver with multiple repeaters to multiple available channel bandwidths via multibeam arrays on both the transmitter and the receiver. Modulator and demodulator are identified.

FIG. 9 depicts a communication configuration between a transmitter 7100 and a receiver 7200 via four separated active scattering devices or repeaters 7180 (7180-1, 7180-2, 7180-3 and 7180-4). A main difference of this configuration from the one in FIG. 8 is an inserted wavefront multiplexing (WF muxing) processor 915 and a demultiplexing (demuxing) processor 925. FIG. 9 features more antenna elements in both the transmitter 7100 and the receiver 7200, and more active scattering devices 7180 in the propagation channel. The spatial processor 7102 in the transmitter 7100 and the spatial processor 7202 in receiver 7200 do beam forming, which includes making connectivity to desired repeaters and discriminating against undesired repeaters in each beam.

As an example depicted in FIG. 9, an input data stream, A, is converted into a signal stream, S, by a modulator 7109, and then segmented into 31 segments by a first TDM demuxer 7103 before a WF multiplexer 915, which features a 32-to-32 Hadamard transformer. There are 31 of the 32 input ports of the WF muxer 915, which are connected to the 31 segments of signal stream S. The remaining one is for a known probing signal stream (Pb). On the other hand, the 32 outputs of the WF muxer 915 as 32 subchannels are separated into two 16 WF muxed groups via two TDM muxers 7104 with outputs indicated by $S_1$ and $S_2$ respectively. In other words, two groups of 16 sub-channels are used to transport the 32 continuous outputs of the WF muxer 915. As a result of the WF muxing 915, a linear combination of every one of the 31 segments of signal stream S and the probing signal Pb will go through one of the 32 sub-channels. There are 32 of these linear combinations.

The functions of the first TDM demuxer 7103 may be replaced by a serial-to parallel converter, a splitter, or a FDM demuxer in various embodiments. However, the counterpart of a TDM muxer 7104 in a receiver must be properly altered accordingly. Similarly the two TDM muxer 7104 may be replaced by FDM or CDM multiplexers as long as the corresponding demuxing mechanisms 7103 in receivers are implemented accordingly. Similarly a WF muxer and its corresponding WF demuxer may be a set of 4-to-4 Butler matrixes, 4-to-4 FFT, or 1024-to 1024 Hadamard transforms. They must be paired; one for WF muxing; a similar one must be selected for WF demuxing.

In the transmitter 7100 for a first sets of embodiments, $S_1$ and $S_2$ are connected to the two input ports to an OB beam forming processor 7102 with 4 outputs, each is connected to an antenna radiating elements 7110. The OB BFN 7102 generates two OB beams concurrently. The first beam features a radiation pattern connecting $S_1$ signal stream to the first repeaters 7180-1, with 3 nulls at the directions of the $2^{nd}$, the $3^{rd}$, and the $4^{th}$ repeaters 7180-2, 7180-3 and 7180-4. The second beam features a radiation pattern connecting $S_2$ signal stream to the fourth repeaters 7180-4, with 3 nulls at the directions of the $1^{st}$, the $2^{nd}$, and the $3^{rd}$ repeaters 7180-1, 7180-2 and 7180-3. As a result, WF muxed S1 signal stream is amplified and re-radiated by the first repeater 7180-1, and concurrently S2 signal stream is amplified and repeated by the fourth repeater 7180-4. Only two of the 4 repeaters are "activated" by the transmitting OB beams initiated by the transmitter 7100. As a result, 16 of the 32 wavefront components are going through the first repeater while the other 16 wavefront components are going through the $4^{th}$ repeater.

In the receiver 7200, there are 4 receiving elements connected by an Rx Beam forming network (BFN) 7202 which also forms two receiving OB beams pointed to the first and the fourth repeaters 7180-1 and 7180-4 respectively. Thus the first and the second outputs of the OB beam former 7202 shall feature received $S_1$ and $S_2$ signals respectively. $S_1$ and $S_2$ are then TDM de-muxed by two TDM demuxers 7103 into 16 sub-channels individually. There are total 32 sub-channels of the received WF muxed signals collected by the two receiving OB beams respectively. These sub-channels shall pass through a bank of adaptive equalizers 7203 compensating for propagation differentials in phases and amplitudes iteratively before connected to a WF demuxer 925. The iterative equalization is optimally controlled by an optimization program 9208 by observing the known probing signals. The received probing signals and the known probing signals are used by the optimization processor 9208 to assure the 32 sub-channels are fully and dynamically equalized. An optimization principle based on a total cost minimization, and an iterative method via a steepest descend algorithm are used. Before the 32 sub-channels are fully equalized, gradients of current "total cost" are measured. The optimization loop will minimize total cost dynamically, measuring differences between received probing signals and known references as parts of "cost functions." Equalizations will move in a direction of minimizing the total cost iteratively. When the equalizations are fully optimized, the received probing signals shall be identical to the known probing signals. The WF demuxer 925 will thus reconstitute the 31 segments of S signal stream and received probing signals.

The 31 reconstituted segments will be aggregated by a TDM muxer 7104 to reconstruct the received signal stream S which is then demodulated to become the received data stream A.

Since the data stream is concurrently delivered via two active paths, the channel bandwidth (via two repeaters) is doubled in comparison of that in FIG. 7.

In a second sets of embodiments, 7102 may form two shaped transmitting beams which may provide different weighting for $S_1$ and $S_2$ for various propagation paths with 4 active repeaters 7180s, while 7202 also forms multiple receiving beams providing directional discriminations among 4 repeaters. Then $S_1$ and $S_2$ are separable in a post processor (not shown) after the beam former 7202 but before the equalizers 7203.

In a third set of embodiments, the Tx beam former 7102 may only form two separated beams by 4 radiating elements 7110, each beam radiating either $S_1$ or $S_2$ and covering a separated group of repeaters for various propagation paths involving all 4 active repeaters 7180s. The Rx beam former 7202 shall form two separated beams covering the two group of repeaters such that $S_1$ and $S_2$ are separable in its two outputs.

In a $4^{th}$ set of embodiments, the spatial processor 7102 in the transmitter 7100 and the spatial processor 7202 in receiver 7200 may be MIMO processing, which comprises functions of measuring current channel state information (CSI) and minimizing the correlations among two outputs of receiving spatial processor 7202. The MIMO pre-processor 7102 manipulates radiated signals by 4 radiating elements 7110 for various propagation paths involving 4 active repeaters 7180s, while 7202 becomes MIMO post processor performing various linear combinations on 4 received signals by 4 receiving elements 7210. Then S1 and S2 are separable in a post processor (7202).

In any cases, embodiments of FIG. 9 are all configured to use parallel paths with active scattering devices in a communications channel transporting two independent signal streams. Thus it doubles the available channel bandwidth as compared to that in FIG. 7

Figure 9A:
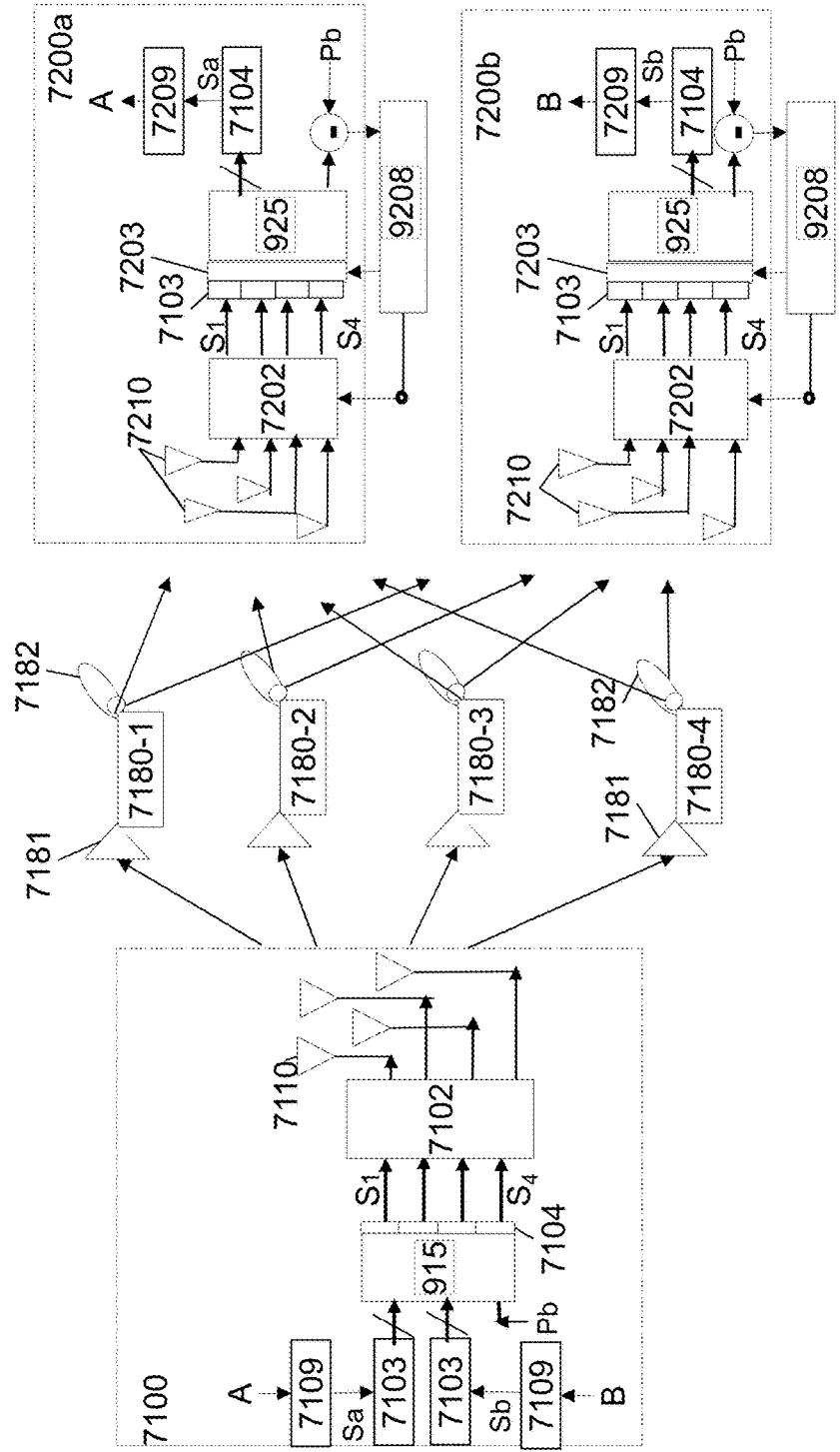
FIG. 9a depicts an example on wireless communications via wavefront multiplexing/demultiplexing between a transmitter and two receivers with multiple repeaters to multiple available channel bandwidths via multibeam arrays on both the transmitter and the receiver. Modulator and demodulator are identified.

FIG. 9a depicts 4-times reuse of spectrum of a transmitting source for two users at two destinations via the same four repeaters 7180s in FIG. 9. Two input data streams, A and B, are converted into two signal streams, Sa and Sb, by two separated modulators 7109 respectively. Sa and Sb are then segmented into 16 and 15 segments by a first and a second TDM demuxers 7103 before a WF multiplexer 915, which features a 32-to-32 Hadamard transformer. 31 of its 32 input ports are connected to the 31 segments of signal streams Sa and Sb. The remaining one is for a known probing signal stream (Pb). The 32 outputs of the WF muxer 915 are separated into four 8-to-8 WF muxed groups via four TDM muxers 7104 with outputs indicated, respectively, by $S_1$, $S_2$, $S_3$, and $S_4$. (S2 and S3 are not shown.) The four groups of 8 or total 32 sub-channels are used to transport the 32 continuous outputs of the WF muxer 915. Every one of the 31 sub-segments of the two signal streams Sa or Sb, and the probing signal Pb shall go through all 32 sub-channels. In a first set of embodiments, $S_1$, $S_2$, $S_3$, and $S_4$ are connected individually to one of the four input ports of an OB beam forming processor 7102 which features 4 outputs. Each output port is connected to an antenna radiating elements 7110. The OB BFN 7102 generates four OB beams concurrently. The first beam features a radiation pattern connecting $S_1$ signal stream to the first repeaters 7180-1, with 3 nulls at the directions of the $2^{nd}$, the $3^{rd}$, and the $4^{th}$ repeaters 7180-2, 7180-3 and 7180-4. The second beam features a radiation pattern connecting $S_2$ signal stream to the second repeaters 7180-2, with 3 nulls at the directions of the $1^{st}$, the $3^{rd}$, and the $4^{th}$ repeaters 7180-1, 7180-3 and 7180-4. The third beam features a radiation pattern connecting $S_3$ signal stream to the third repeaters 7180-3, with 3 nulls at the directions of the $1^{st}$, the $2^{nd}$, and the $4^{th}$ repeaters 7180-1, 7180-2 and 7180-4. The fourth beam features a radiation pattern connecting $S_4$ signal stream to the fourth repeaters 7180-4, with 3 nulls at the directions of the $1^{st}$, the $2^{nd}$, and the $3^{rd}$ repeaters 7180-1, 7180-2 and 7180-3. As a result, WF muxed $S_1$ signal stream is amplified and re-radiated by the first repeater 7180-1, and concurrently $S_2$, $S_3$, and $S_4$ signal streams are amplified and repeated by the second repeater 7180-2, the third repeater, 7180-3, and the fourth repeater 7180-4 respectively. All 4 repeaters are "activated" by the transmitting OB beams initiated by the transmitter 7100. As a result, the first 8 of the 32 wavefront components are going through the first repeater 7180-1 while the last 8 wavefront components are going through the $4^{th}$ repeater 7180-4.

There are two receivers 7200a and 7200b at destinations, which are nearly identical to the one shown in FIG. 9, except the receivers are programmed to form 4 separated beams aiming for 4 different repeaters. Furthermore the first receiver 7200a is programmed to aggregate the first 16 outputs from the WF demuxer 925, converting the 16 parallel received signal substreams into Sa signal stream by a TDM muxer 7104. The received data stream A is recovered by a demodulator 7209. Optimizations for path equalizations are identical operations as those in FIG. 9

Similarly, the second receiver 7200b is programmed to aggregate the second 15 outputs ($17^{th}$ to $31^{st}$ output ports) from the WF demuxer 925, converting the 15 parallel received signal substreams into Sb signal stream by a second TDM muxer 7104. The received data stream B is recovered by a second demodulator 7209.

Since the two data streams A and B are concurrently delivered via four active paths, the channel bandwidth (via four repeaters) is quadrupled in comparison of that in FIG. 7. An overhead of ~3% or $\frac{1}{32}$ of the total bandwidth is occupied by the probing signal Pb for channel calibrations and equalizations. The remaining 97% of bandwidths are dynamically re-allocable among the two data streams.

Figure 9B:
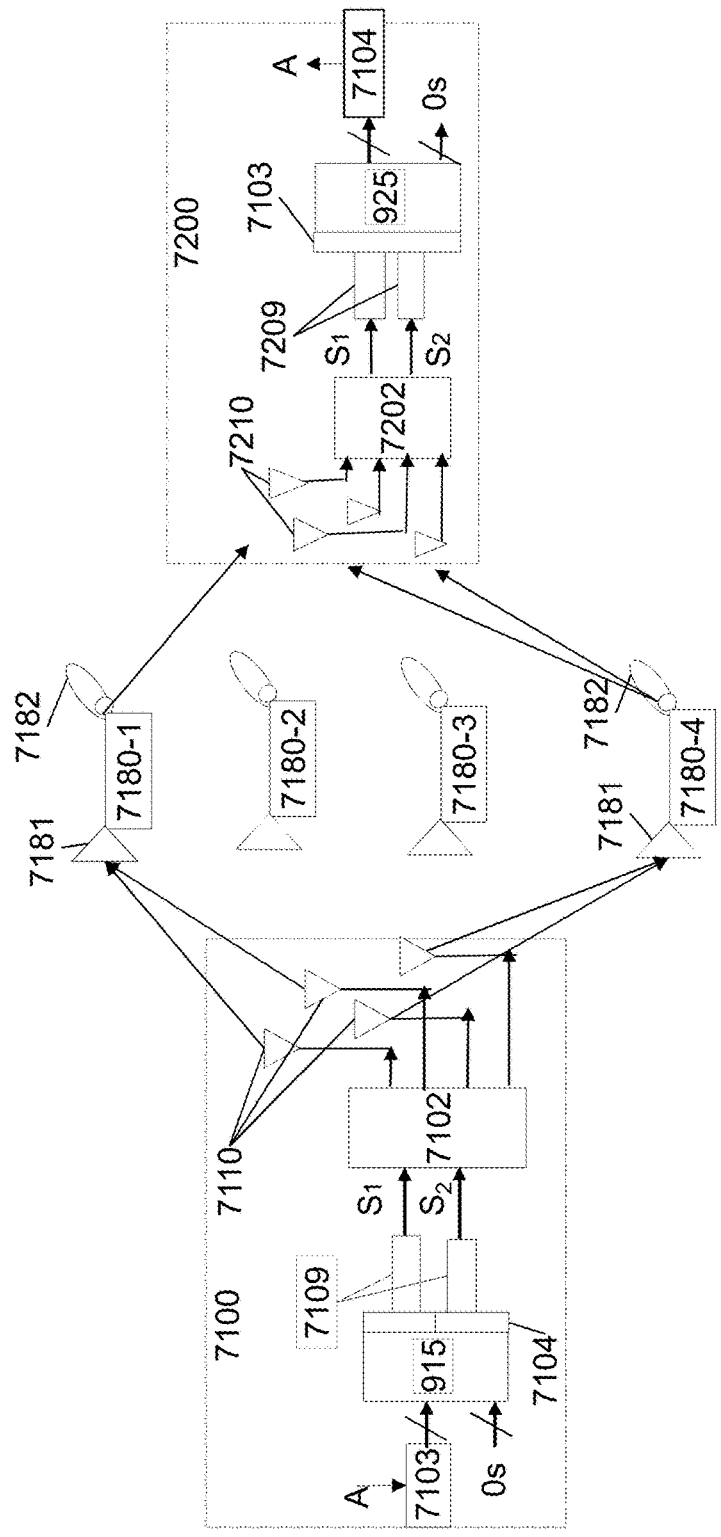
FIG. 9b depicts an example on wireless communications via "non-coherent" wavefront multiplexing/demultiplexing between a transmitter and a receiver with multiple repeaters for enhanced security and redundancy via multibeam arrays on both the transmitter and the receiver. Modulator and demodulator are identified.

FIG. 9b depicts data redundancy in transport with 2-times reuse of spectrum from a transmitting source to a destination via two repeaters 7180 (7180-1 and 7180-2) and modified configurations based on the first set of embodiments of those in FIG. 9. It is one of the wavefront multiplexing (WF muxing) applications. However, the muxing and demuxing are on data not on signals. It is a "non-coherent" application of WF muxing/demuxing.

WF muxing 915 is performed at the transmitter source 7100 on data stream A before converted to signal streams $S_1$ and $S_2$ by modulators 7109. Similarly the WF demuxing 925 is performed to generate received data streams after the received signals streams $S_1$ and $S_2$ are converted into data substreams by demodulators 7209 in a destination 7200. The frontends of the transmitter 7100 comprises beam former 7102 and radiating elements 7110; and those of the receiver 7200, receiving elements 7210 and Rx beam former 7202, are identical to those in FIG. 9. Their variations which have been discussed are identical.

The input data stream, A, are segmented into 32-x data substreams, before connected to a WF multiplexer 915, which features a 32-to-32 Hadamard transformer. 32-x of its 32 input ports are connected to the 32-x data substreams. The remaining x ports are for known data streams (e.g. 0s). The 32 outputs of the WF muxer 915 are grouped separately into two 16 WF muxed groups via two TDM muxers 7104 followed by two modulators 7109 with outputs indicated, respectively, by $S_1$ and $S_2$. Every one of the 32-x substreams of the data stream A, and the known data substreams (e.g. 0s) shall go through all 32 sub-channels. The 32 outputs of the WF muxer 915 are 32 different weighted sums of all the 32-x digital substreams and the x know data substreams. The 32 outputs of the WF muxer 915 after modulations separately are transported independently by the 32 sub-channels. There are 32 linear combinations for transmissions and propagations through a channel with two repeaters 7180-1 and 7180-4.

$S_1$ and $S_2$ are connected individually to one of the two input ports of an OB beam forming network (BFN) 7102 which features 4 outputs. Each output port is connected to an antenna radiating elements 7110. The OB BFN 7102 generates two OB beams concurrently. The first beam features a radiation pattern connecting $S_1$ signal stream to the first repeaters 7180-1, with 3 nulls at the directions of the $2^{nd}$, the $3^{rd}$, and the $4^{th}$ repeaters 7180-2, 7180-3 and 7180-4. The second beam features a radiation pattern connecting $S_2$ signal stream to the fourth repeaters 7180-4, with 3 nulls at the directions of the $1^{st}$, the $2^{nd}$, and the $3^{rd}$ repeaters 7180-1, 7180-2 and 7180-3. As a result, WF muxed $S_1$ signal stream is amplified and re-radiated by the first repeater 7180-1, and concurrently $S_2$ signal stream is amplified and repeated by the $4^{th}$ repeater 7180-4, respectively. Only 2 of the 4 repeaters are "activated" by the transmitting OB beams initiated by the transmitter 7100. As a result, the first 16 of the 32 wavefront components are going through the first repeater 7180-1 while the last 16 wavefront components are going through the $4^{th}$ repeater 7180-4.

At a destination there are only 32-x unknown data substreams but with 32 received linear combinations of these data substreams. Therefore, there are inherently redundant transmissions. When x=4 and for recovering all data substreams, we will only need to receive any 28 of the 32 linear combinations for transmissions.

The receiver 7200 at the destination is nearly identical to the one shown in FIG. 9. The receivers are programmed to form 2 separated beams aiming for 2 different repeaters 7180-1 and 7180-4. The two received signal substreams $S_1$ and $S_2$ are demodulated into two groups of WF muxed data streams, which are TDM de-muxed by 7103 and then WF de-muxed via 925 into 32-x recovered received data substreams. A TDM muxer 7104 will aggregate the recovered 32-x data substreams into the received data stream A.

Figure 10:
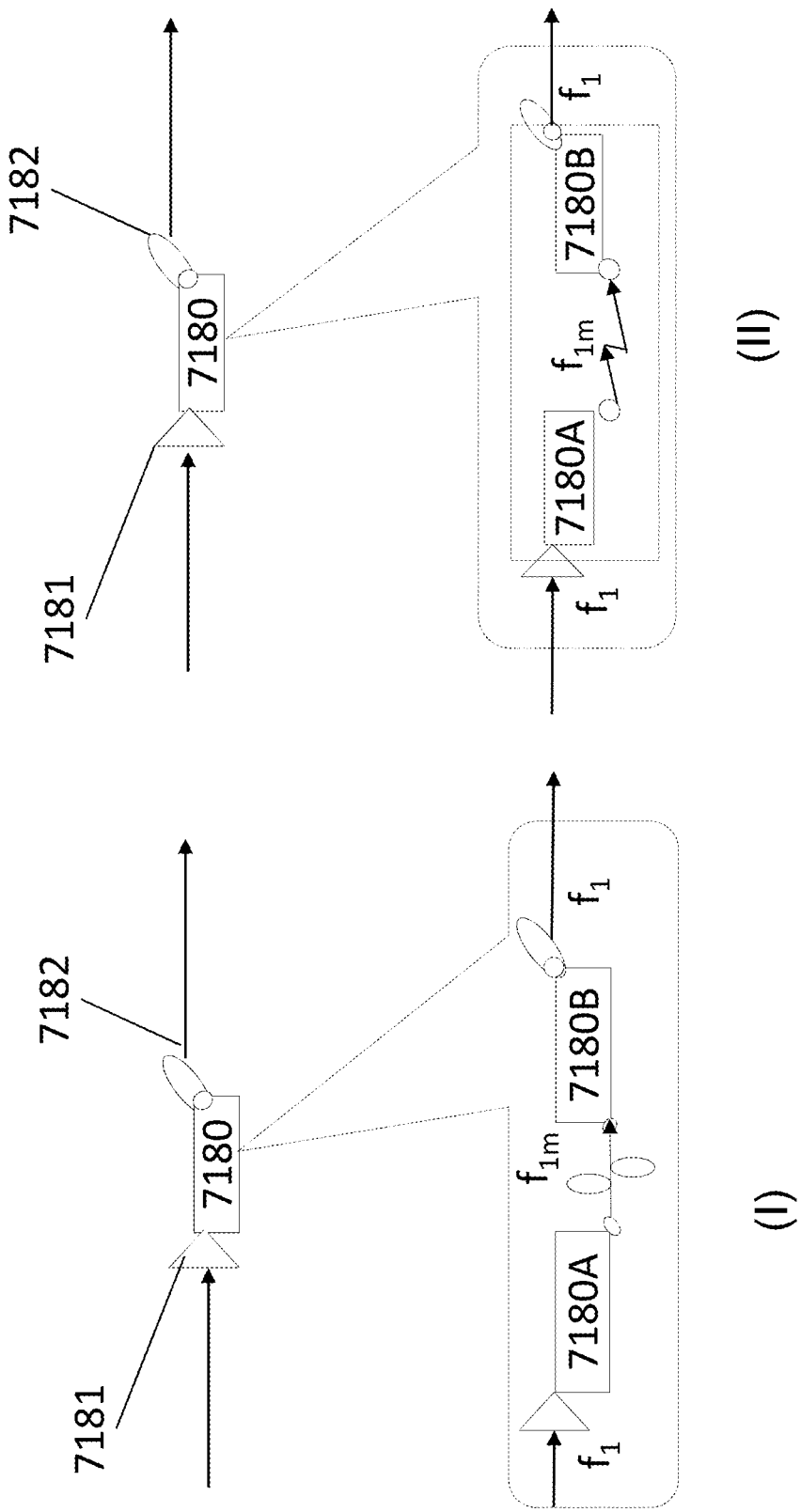
FIG. 10 depicts two examples of repeaters made by two transponders: (I) cascaded via wired connection, and (II) cascaded via wireless connection.

FIG. 10 depicts two different configurations of a wireless repeaters 7180. The repeaters 7180 feature a common frequency $f_1$ for both inputs and outputs. In panel (I), a repeater 7180 comprises two sections: a receiving section 7180A and a re-radiation section 7180B. The receiving section features wireless inputs at $f_1$ and wired outputs at $f_{1m}$, where $f_1$ is in RF such as L/S, C-band frequency slots, and $f_{1m}$ are in Ku, Ka, millimeter-wave (mm-wave) or optical frequencies. The re-radiating section features wired inputs at $f_{1m}$ and wireless outputs at $f_1$. In panel (II), a repeater 7180 also comprises two sections; a receiving section 7180A and a re-radiation section 7180B. The receiving section features wireless inputs at $f_1$ and wireless outputs at $f_{1m}$, where $f_1$ is in RF such as L/S, C-band frequency slots, and $f_{1m}$ are in Ku, Ka, mm-wave or optical frequencies. The re-radiating section features wireless inputs at $f_{1m}$ and wireless outputs at $f_1$.

Figure 10A:
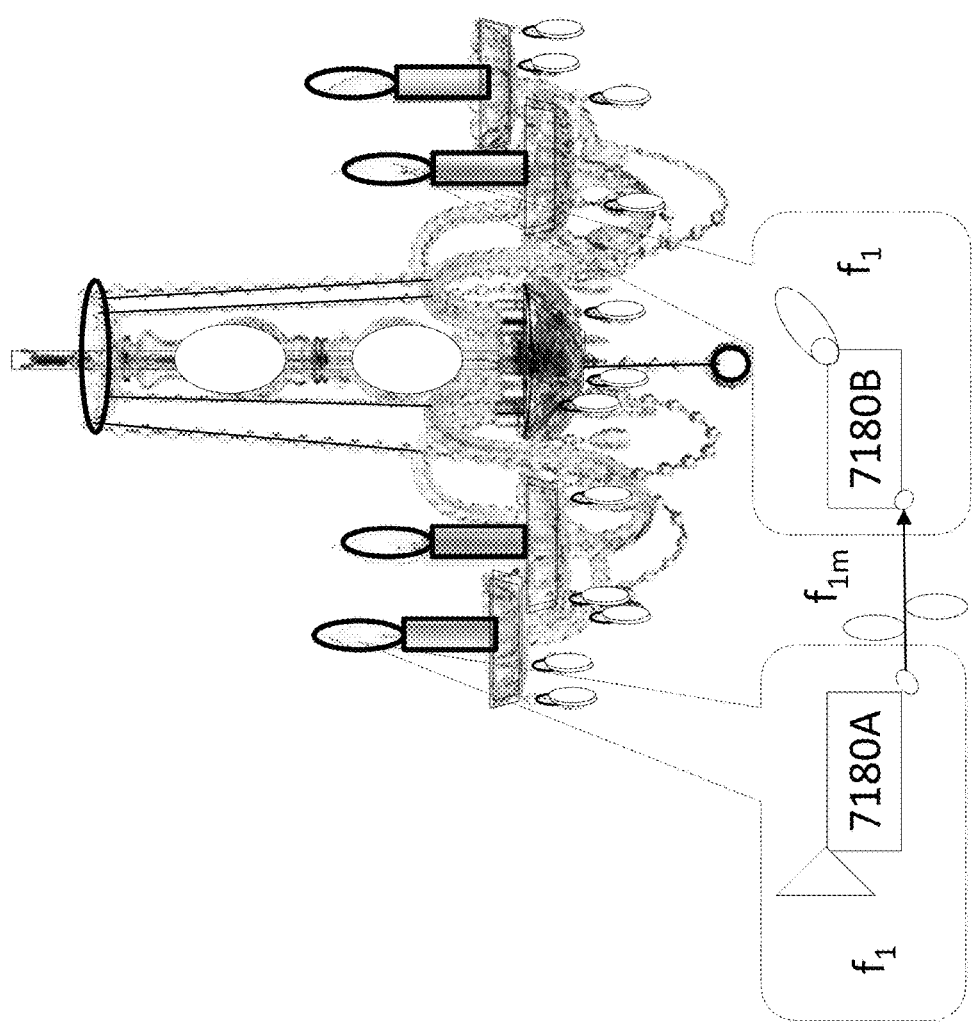
FIG. 10a depicts an example of a wireless repeater on a chandelier.
Figure 10B:
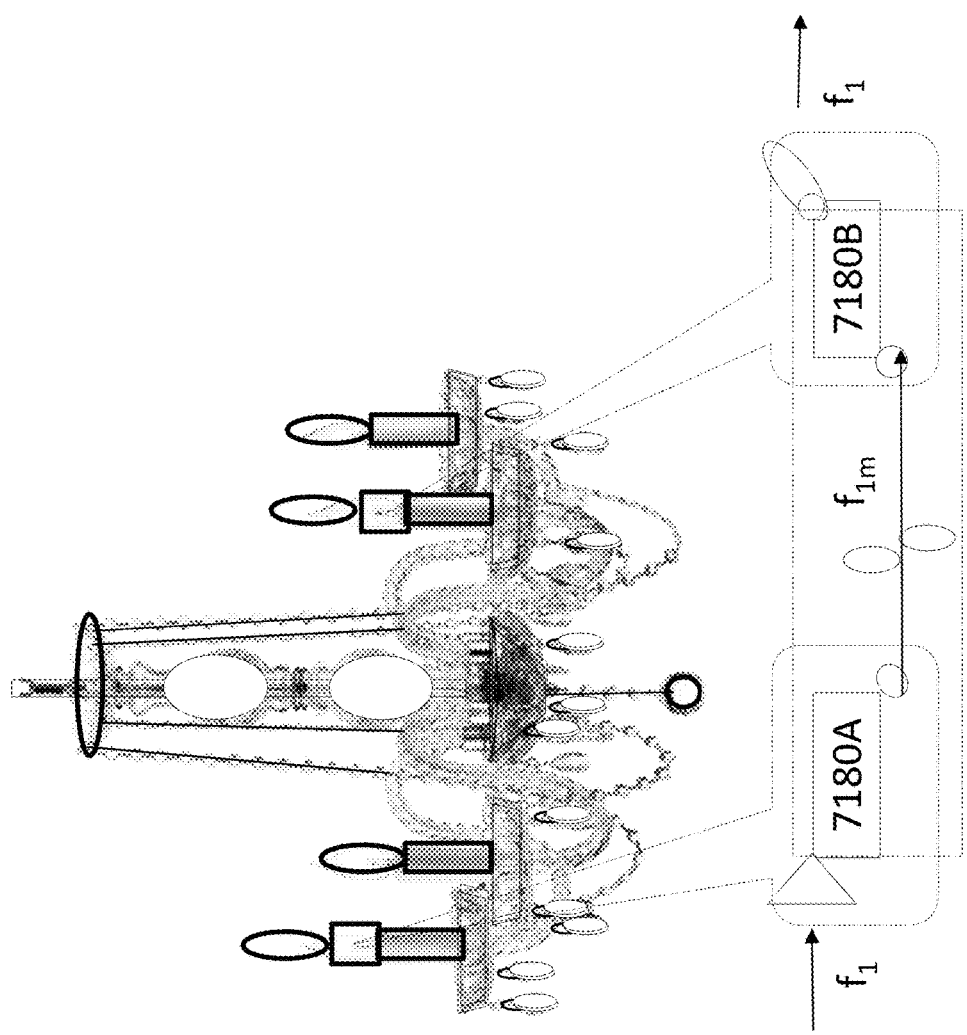
FIG. 10b depicts a second example of a wireless repeater on a chandelier.

FIG. 10a and FIG. 10b depict configurations of wireless repeaters 7180 in a crystal chandelier, which serves as an anchoring platform. The repeater 7180, featuring a common frequency $f_1$ for both inputs and outputs, comprises two sections: a receiving section 7180A and a re-radiation section 7180B identical to the one depicted in FIG. 10 panel (I). The receiving section, built as a small light bulb in FIG. 10a or an extending section for a light bulb in FIG. 10b, features wireless inputs at $f_1$ and wired outputs at $f_{1m}$, where $f_1$ is in RF such as L/S, C-band frequency slots, and $f_{1m}$ are in Ku, Ka, mm wave or optical frequencies. The re-radiating section is also built as another small light bulb in FIG. 10a or an extending segment for a light bulb in FIG. 10b, and features wired inputs at $f_{1m}$ and wireless outputs at $f_1$. The two sections are interconnected via wired RF, mm-wave, or optical links at $f_{1m}$. The two configurations are interchangeable among the two sections: the light bulbs for receiving sections and the extending segment for re-radiation sections, or vice versa. Chandeliers are used to exemplify anchoring platforms for active scattering devices. These platforms may be slow swinging locally.

Figure 10C:
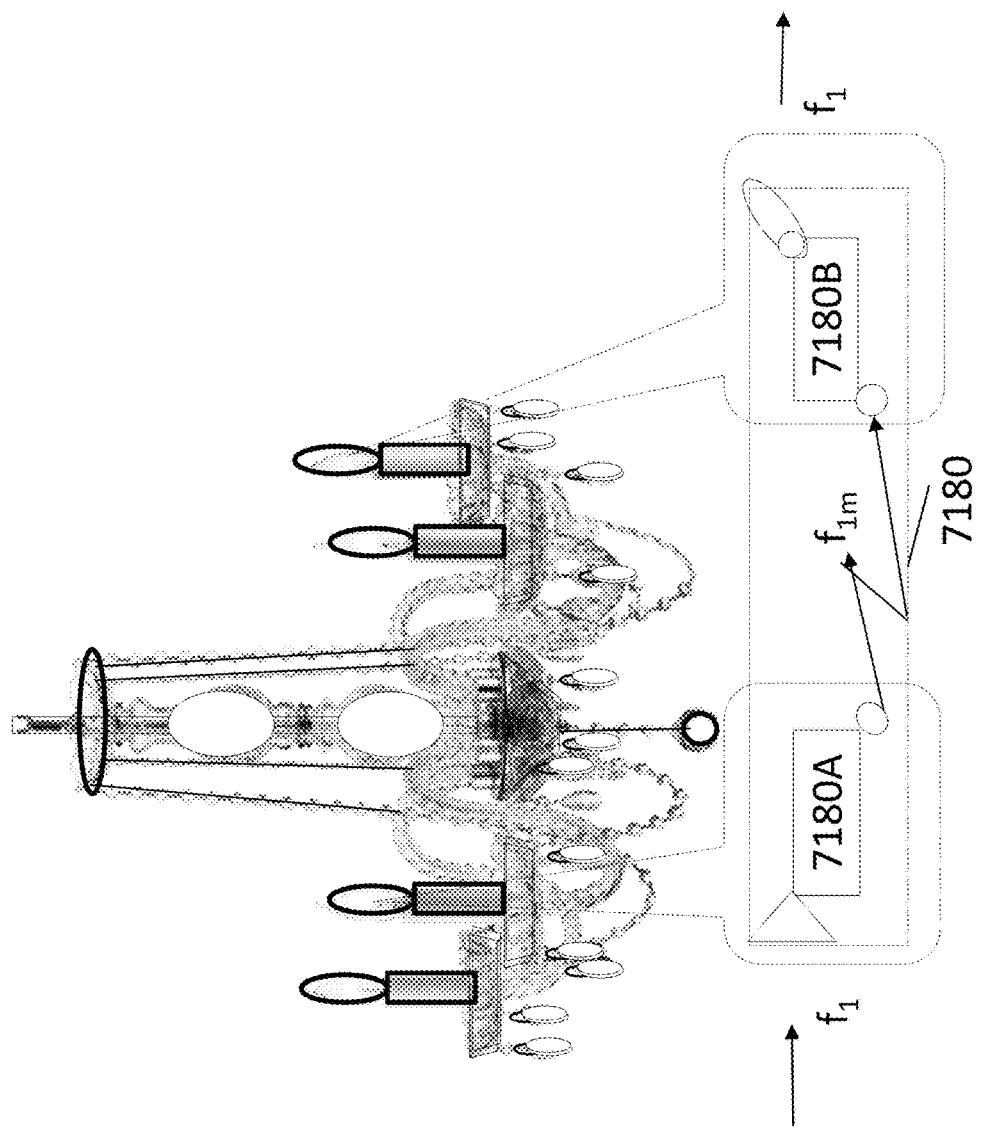
FIG. 10c depicts a third example of a wireless repeater on a chandelier.
Figure 10D:
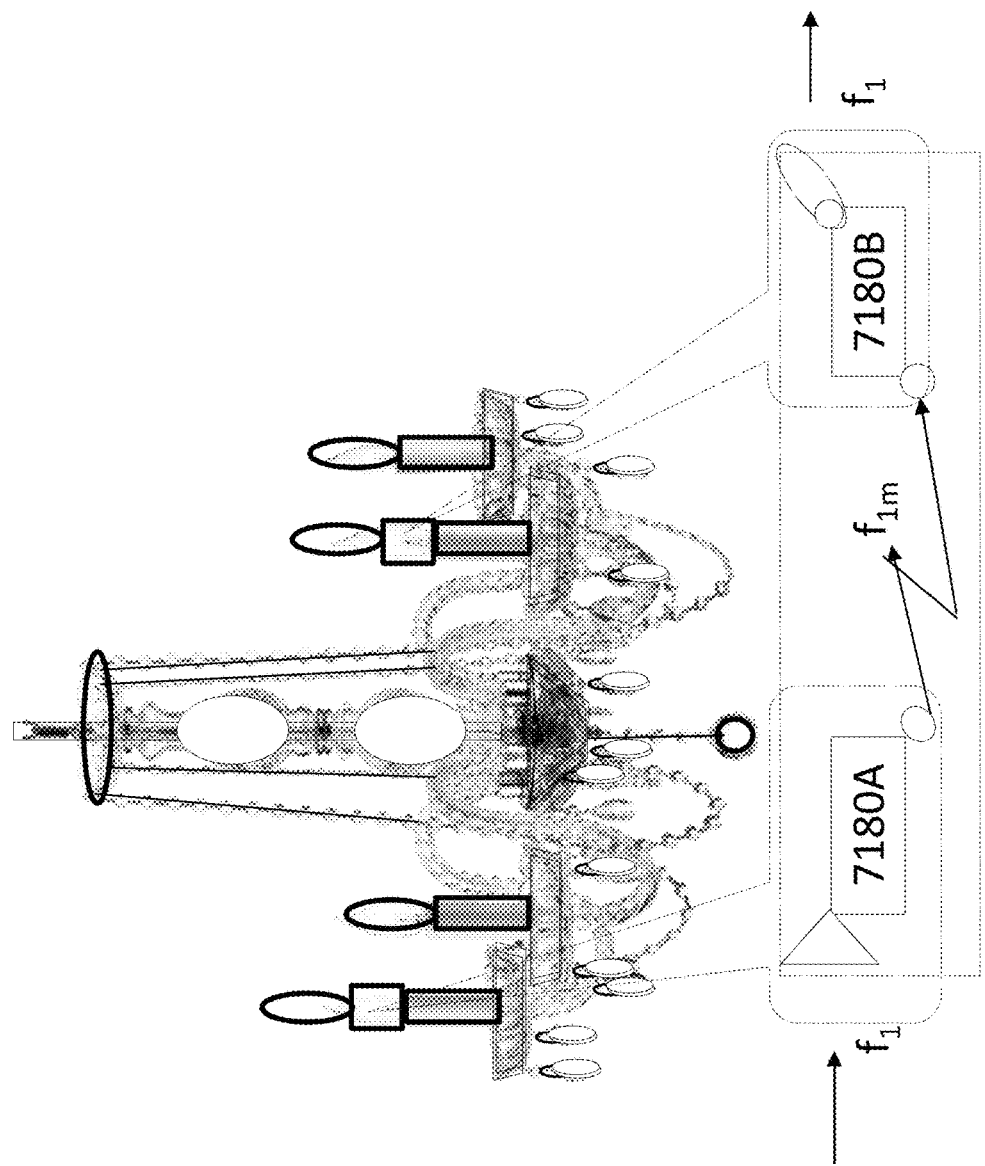
FIG. 10d depicts a 4$^{th}$ example of a wireless repeater on a chandelier.

FIG. 10c and FIG. 10d depict configurations of wireless repeaters 7180 in a crystal chandelier. The repeater 7180, featuring a common frequency $f_1$ for both inputs and outputs, comprises two sections: a receiving section 7180A and a re-radiation section 7180B identical to the one depicted in FIG. 10 panel (II). The receiving section, built as a small light bulb in FIG. 10c or an extending section for a light bulb in FIG. 10d, features wireless inputs at $f_1$ and wireless outputs at $f_{1m}$, where $f_1$ is in RF such as L/S, C-band frequency slots, and $f_{1m}$ are in Ku, Ka, mm-wave or optical frequencies. The re-radiating section is also built as another small light bulb in FIG. 10c or an extending section for a light bulb in FIG. 10d, and features wireless inputs at $f_{1m}$ and wireless outputs at $f_1$. The two sections are interconnected via wireless RF links at $f_{1m}$. The two configurations are interchangeable among the two sections: the light bulbs for receiving sections and the extending segment for re-radiation sections, or vice versa.

Figure 10E:
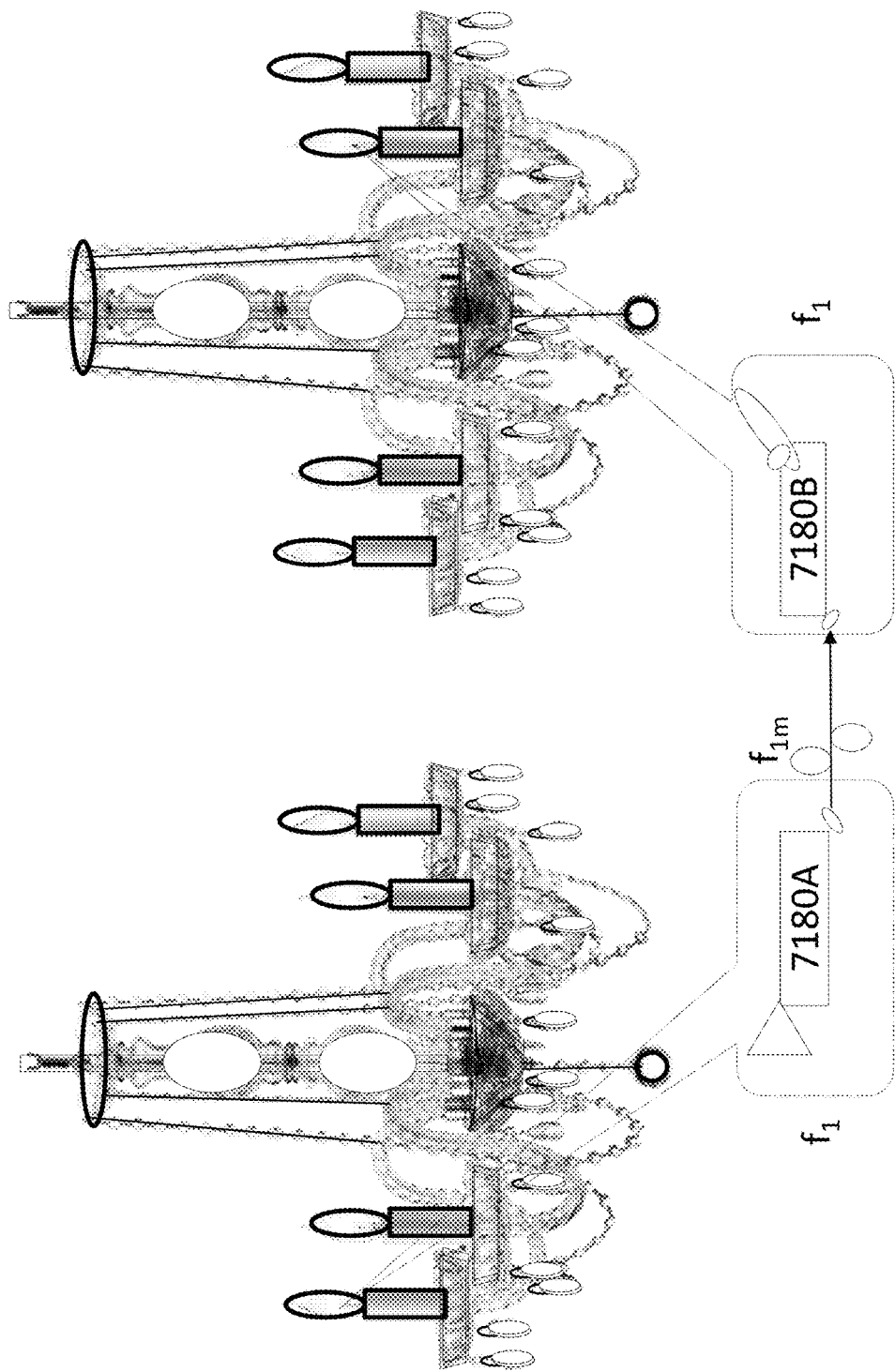
FIG. 10e depicts an example of a wireless repeater distributed on two chandeliers.

FIG. 10e depicts configurations of wireless repeaters 7180 in two crystal chandeliers. The repeater 7180, featuring a common frequency $f_1$ for both inputs and outputs, comprises two sections: a receiving section 7180A and a re-radiation section 7180B identical to the one depicted in FIG. 10 panel (I). The receiving section, built as a small light bulb as shown or an extending segment for a light bulb (not shown), features wireless inputs at $f_1$ and wired outputs at $f_{1m}$, where $f_1$ is in RF such as L/S, C-band frequency slots, and $f_{1m}$ are in Ku, Ka, mm wave or optical frequencies. The re-radiating section, also built as another small light bulb mounted on another Chandelier, features wired inputs at $f_{1m}$ and wireless outputs at $f_1$. The two sections are interconnected via wired RF or optical links at $f_{1m}$. The two configurations are interchangeable among the two sections: the light bulbs for receiving sections and the extending segment for re-radiation sections, or vice versa.

Figure 10F:
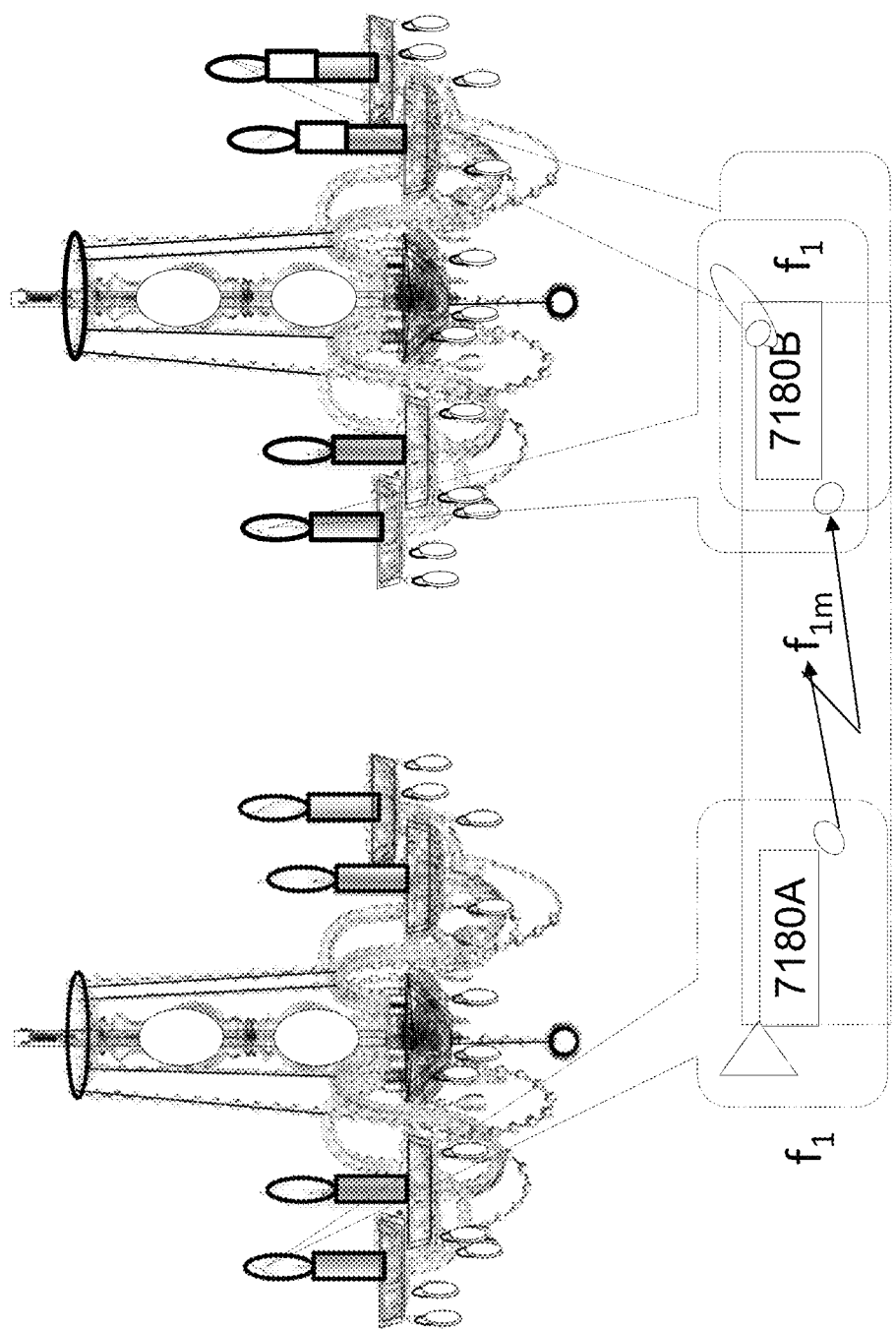
FIG. 10f depicts an example of a wireless repeater with one receiving section and multiple re-radiating sections distributed on multiple chandeliers.

FIG. 10f depicts another configuration of wireless repeaters 7180 in two crystal chandeliers. The repeater 7180, featuring a common frequency $f_1$ for both inputs and outputs, comprises two sections: a receiving section 7180A and a re-radiation section 7180B identical to the one depicted in FIG. 10 panel (II). The receiving section, built as a small light bulb as shown or an extending segment for a light bulb (not shown), features wireless inputs at $f_1$ and wireless outputs at $f_{1m}$, where $f_1$ is in RF such as L/S, C-band frequency slots, and $f_{1m}$ are in Ku, Ka, mm-wave or optical frequencies. There are two re-radiating sections also built as two separated small light bulbs mounted on another chandelier, each featuring wireless inputs at $f_{1m}$ and wireless outputs at $f_1$. The two sections are interconnected via wireless RF or optical links at $f_{1m}$. The two configurations are interchangeable among the two sections: the light bulbs for receiving sections and the extending segment for re-radiation sections, or vice versa.

Chandeliers are used for anchoring platforms for the active scattering devices in previous examples. Other furniture, picture frames, vases, light fixtures, or others may also be used for anchoring active scattering devices, repeaters or transponders, for efficient indoor or outdoor transmissions.

Figure 11:
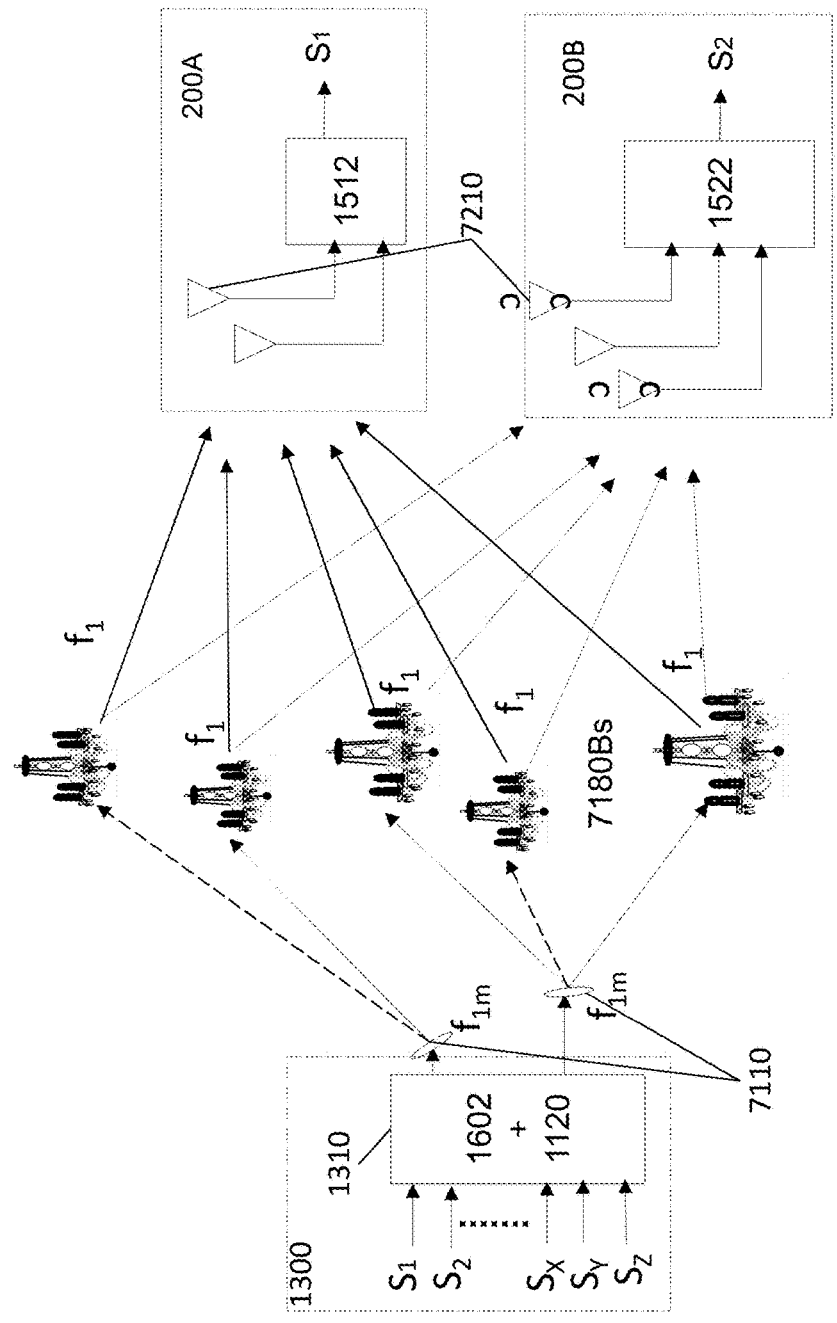
FIG. 11 depicts a multiple user communications system with repeaters distributed on multiple chandeliers for remote beam forming.

FIG. 11 depicts configurations of forward link remote beam forming for multiple users in a spoke-and-hub or a star communications architecture. Let us assume the beam forming is performed digitally in here. Cell base mobile phone and WiFi are mostly in spoke-and-hub configuration. WF muxing/demuxing are also included for powers and bandwidths sharing among multiple users. Configurations for return links (not shown) are similar but with the receiving sections 7180A of repeaters distributed and anchored on chandeliers.

The key features of FIG. 11 are (1) back channels or feeder links via a carrier $f_{1m}$ in Ku, Ka or mm wave inherently with high communications bandwidth for multiplexing N sets of element signals between array elements 7180B distributed on chandeliers and a remote digital beam forming (DBF) processor 1602 on ground, (2) fore-ground communications via $f_1$ at L/S or C-band between the array elements 7180B and users 200, (3) transmitter antennas operating in Ku, Ka or mm wave bands feature more directional gain for each individual beams to address N individual scattering devices 7180 with unique and different signals (assuming each element radiating signals within a bandwidth B), (4) number of beams ($N_b$) and associated beam-shapes and pointing directions are processed in the remote DBF controlled through $N_b$ sets of beam weighting vectors (where Nb≤N and each beam features a full bandwidth of B), and (5) for users requiring less bandwidth, one of the Nb beams can be divided over a full bandwidth B into multiple beams pointed to the same coverage. The feeder links comprise transmitting elements 7110 from the remote processing facility 1300. It is possible to form dynamic beams to track individual users in motions. Beam forming from a remote DBF processor becomes a technique for dynamic resource allocations for both bandwidth and powers. As far as users are concerned, the feeder links or back channels are completely transparent.

In forward link configurations, feeder-links utilize conventional multiplexing techniques such as FDM, CDM, and TDM to multiplex and then transport multiple element signals to individual remote elements concurrently. These elements are indexed in frequency, codes, time slots, beam positions, or combinations of above. We use FDM in all examples for illustration purposes. All these techniques are applicable to the current invention for different configurations and embodiments.

For conventional beam forming, element locations are critical information for a remote beam forming facility and are continuously monitored. Among many techniques, these locations are calculated based on known positions of multiple fixed users or fixed calibration sites in a coverage. Relative geometries of array elements distributed on individual chandeliers are useful in deriving individual positions and orientations of all elements, once any three array elements on a chandelier are fully calibrated. Multiple positioning devices such as GPS receivers on a fixed platform, such as a chandelier, can be used to monitor the positions and orientations of an anchoring platform. Distributed array elements on the platform are thus derivable for their positions and orientations.

The remote beam forming function 1310 in the transmitter 1300 comprises functions of beam forming 1602 and those of a frequency division multiplexer 1120. The beam forming function 1602 will form many beams with a first one for $S_1$ aiming for a high performance connectivity to the first user 200A and concurrently forming "quiet zones" or nulls toward receiving arrays of all other users, including a second user 200B. A second beam is formed for high connectivity to the second user 200B and concurrently forming "quiet zone" or nulls toward all other receiving arrays in the coverage, including the one of the first user 200A.

The repeater assets on the same chandeliers may also be "shared" among different remote DBF processors at different physical location. These repeaters may be shared by multiple operators, including a one operating the transmitter 1300, through conventional multiplexing of frequency division (FDM), time division (TDM), code division (CDM), or combinations of all above.

Figure 11A:
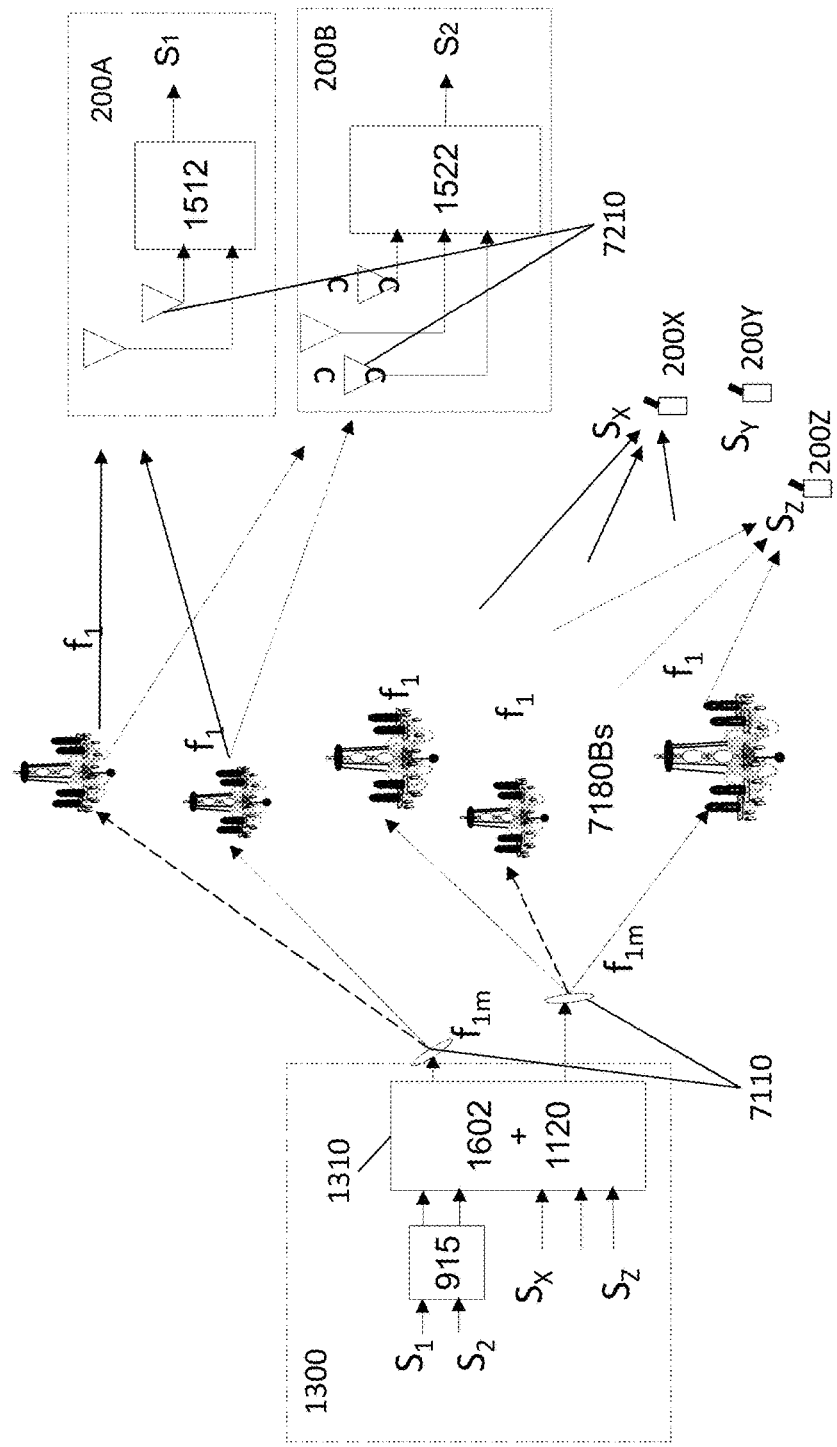
FIG. 11a depicts an example of propagation in a channel with multiple active scattering devices for communications between a source and destinations with wavefront multiplexing and remote beam forming at the source.

FIG. 11a depicts identical configurations as the one in FIG. 11, except (1) a WF muxing processor 915 is included in the transmitter 1300, and (2) three more users are depicted over a common coverage area with multiple users 200. The first two signal streams, $S_1$ and $S_2$, are WF muxed by WF muxer 915 before connected to the first and second input ports of the DBF 1602. As a result, two different linear combinations, C1 and C2, are sent to destinations through the first and the second beams, respectively. One example of such a WF muxer will result in $C1=S_1+S_2$, and $C2=S_1-S_2$.

The first and the second beams in the same $f_1$ frequency band are reshaped via different groups of active scattering devices (without these devices communicating) but each shall cover both the first user 200A and the second user 200B concurrently.

At receiving side over a common coverage area, the two receivers 200A and 200B with multiple receiving elements 7210 and spatial processors 1512 and 1522 shall separate C1 and C2 signal streams independently either through conventional beam forming processing or MIMO techniques. The spatial processor 1512 in the first receiver 200A shall perform additional processing through a linear combination of C1 and C2 to recover $S_1$. Similarly, the spatial processor 1522 in the second receiver 200B shall perform another additional processing through a second linear combination of C1 and C2 to recover $S_2$. Unique linear combination operations in a receiver 200A or 200B are combinations of WF demuxing and adaptive path length equalizations for the dynamic effects of amplitude and phase differentials between the first beam and the second beams.

The operation for low gain users such as those 200x, 200y and 200z will be addressed with the next two figures.

Figure 11B:
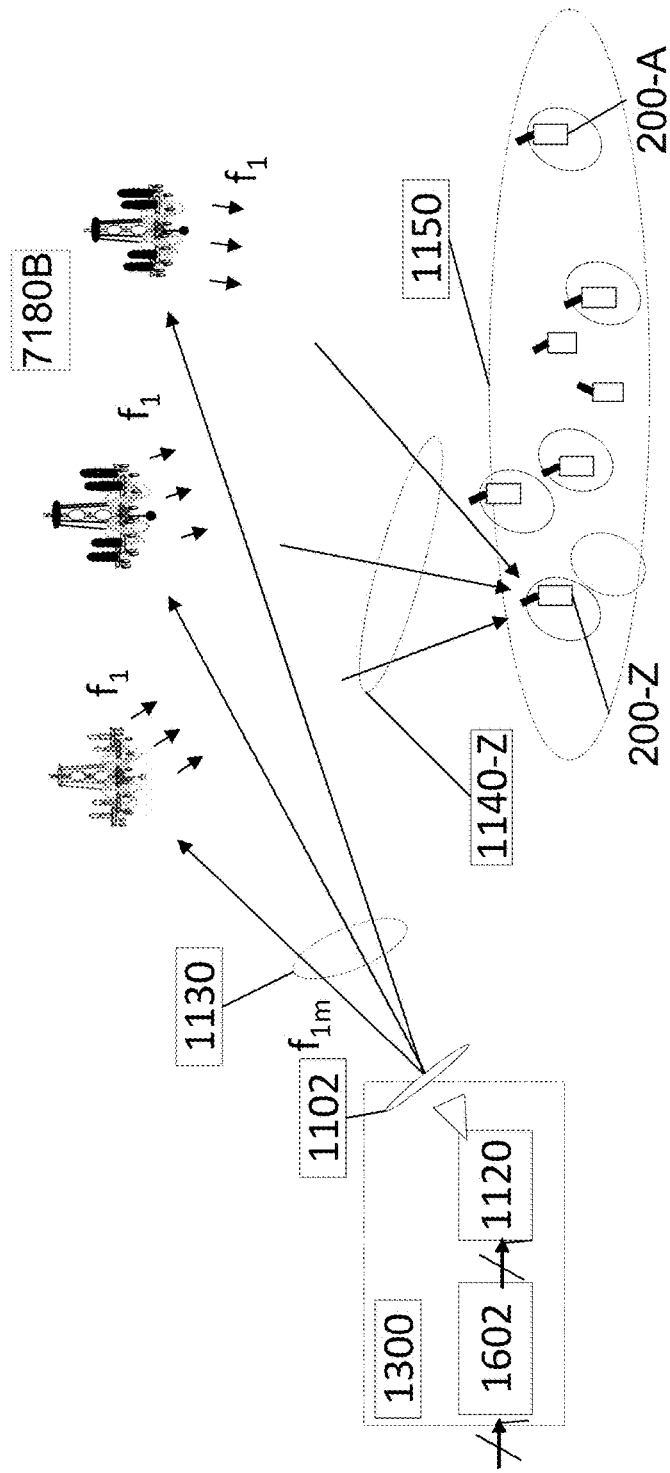
FIG. 11b depicts an example of multiple re-radiating sections of repeaters distributed on multiple chandeliers as transmitting elements of an array with remote beam forming capability for forward links.

FIG. 11b depicts configurations of N wireless repeaters 7180B in multiple crystal chandeliers to functions as a forward link array antenna with a remote beam forming 1602 in a transmitter 1300 on ground. It is applicable to WiFi applications or small/microcell for mobile phones. The re-radiation sections 7180B of N repeaters 7180, featuring a common transmitting (Tx) frequency $f_1$ for all outputs, while the N inputs for the re-radiation sections 7180B are assigned at N input frequency slots from $f_{1m1}$, $f_{1m2}$, ... to $f_{1mn}$, where these N frequency slots are allocated in Ku, Ka, mm-wave, or optical frequency ranges. For instance, the re-radiating sections 7180B of the N repeaters mounted on chandeliers may be assigned to serve as N transmitting elements of a digital beam forming (DBF) array with remote beam-forming capability. The DBF array will feature $N_b$ shaped beams concurrently tracking $N_b$ users dynamically, where $N_b \leq N$. The array will operate in $f_1$ frequency, say 2.5 GHz, with a bandwidth of 30 MHz over a foreground coverage area 1150. There will be one unique wavefront for one such shaped beam 1140-Z, covering and tracking one user 200-Z. Total $N_b$ sets of wavefronts will pass through the N distributed radiating elements concurrently.

The remote beam forming capability is accomplished via a back channel 1130 at $f_{1m}$~30 GHz at Ka band supporting with a total bandwidth of 600 MHz or 900 MHz; 30 MHz per element times N elements where N=20 or 30. These N elements 7180Bs are frequency indexed and distributed among multiple chandeliers.

For a 20 element array to generate 16 beams as an example, FIG. 11a features 20 of these slots for a remote beam-forming of a transmitting array at 2.5 GHz. A spatial processor 1602 on ground will perform DBF for 16 signal streams, each with 20 weighted replicates, and then redistribute them into 20 groups, each as an aggregated stream of 16 weighted input signal streams. This processing is to convert 16 input signals (or 16 beam signals) to 20 concurrent element signal streams. Each element signal stream is a sum of weighted 16 input signal streams. On the other hand, the 20 weighting parameters of an input signal stream for a first beam among the 20 sums are the components of a beam weighting vector (BWV) of the first beam. There are 16 BWVs, each with 20 weighting components.

The 20 element signals at $f_1$, each with 30 MHz bandwidth are frequency division multiplexed (FDM) on a carrier $f_{1m}$~30 GHz by a FDM muxer 1120 on a ground remote facility, amplified and sent by a 30 GHz directional antenna 1102 toward the chandeliers. These re-radiating sections are frequency indexed, each shall only picks up its signals for re-radiations.

As a result of radiating elements distributed over many chandeliers at 2.5 GHz, an effective aperture for an array with these elements within a 3-m circular projection shall feature very fine resolutions better than 3° near boresite.

Figure 11C:
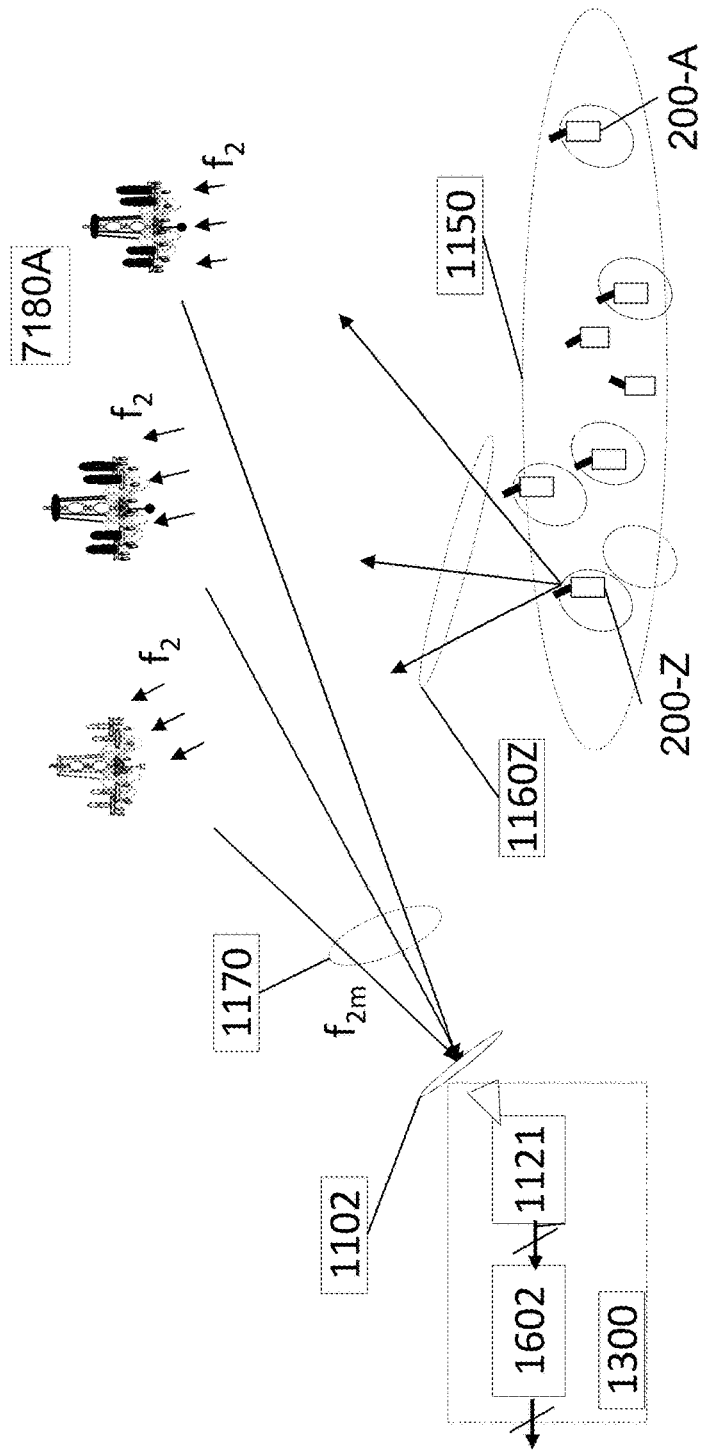
FIG. 11c depicts an example of multiple receiving sections of repeaters distributed on multiple chandeliers as receiving elements of an array with remote beam forming capability for return links.

FIG. 11c depicts configurations of N wireless repeaters 7180 in multiple crystal chandeliers to function as a return link array antenna. The receiving (Rx) sections 7180A of N repeaters 7180, featuring a common frequency $f_2$ for all inputs, while the N outputs are assigned at N frequency slots from $f_{2,m1}$, $f_{2,m2}$ to $f_{2mn}$. These N frequency slots are allocated in Ku, Ka, mm-wave, or optical frequency ranges. For instance, the receiving sections 7180A of the N repeaters mounted on the chandeliers may be assigned to serve as the N receiving elements at $f_2$ of an Rx digital beam forming (DBF) array with remote beam-forming capability. The Rx DBF array will feature $N_b$ shaped beams concurrently tracking $N_b$ users dynamically, where $N_b \leq N$. It will operate at $f_2$, say 2.5 GHz, with a bandwidth of 30 MHz. There will be one unique wavefront for one shaped beam. Total $N_b$ sets of wavefronts will be captured through the N distributed receiving elements concurrently.

The remote beam forming capability is accomplished via a back channel at $f_{2m}$~30 GHz supporting with a total bandwidth of 600 MHz or 900 MHz, 30 MHz per element times N elements where N=20 or 30. These N elements 7180As are frequency indexed and distributed among multiple chandeliers.

With 16 users are transmitting various signals at $f_2$ via low gain devices, such as 200A or 200Z over the coverage region 1150 as depicted in FIG. 11c, 16 sets of wavefronts centered on individual users shall propagate toward the chandeliers. One such wavefront 1160z as depicted carrying a set of information is originated from the user 200Z, and will arrive at 20 receiving sections of repeaters distributed on the illuminated chandeliers at different time slots with various amplitudes and phase delays. As a result, each receiving element shall continuously capture an aggregated signal stream, through the natural propagation effects in $f_2$, which is a sum of weighted 16 individual signal streams originated from the 16 users in the coverage 1150. With 20 receiving elements on various chandeliers there are 20 such sums but with various sets of weighting which are highly dependent of the array geometries and angles of arrival for 16 intended receiving signals. These 20 element signal streams are relayed back via a feeder-link 1170 at $f_{2m}$ to the remote DBF processing 1602 on ground for further processing to separate the 16 individual signal streams originated from the coverage 1150.

The 20 element signals with receiving functions at $f_2$, each with 30 MHz bandwidth, are frequency up-converted to a frequency slot with the same 30 MHz bandwidth near a carrier $f_{2m}$~30 GHz. These re-radiating signals are frequency indexed, each shall occupy its signals over the indexed frequency slot for re-radiations. After radiated into space, the spatially combined signals are effectively frequency division multiplexed (FDM) on a carrier $f_{2m}$~30 GHz. Upon captured by a 30 GHz directional antenna 1102 toward the chandeliers on a ground remote facility, signals are amplified, filtered and the FDM de-muxed by a demuxer 1121. As a result, the 20 received element signals are recovered on ground, and then they are converted to baseband and digitized before DBF processing.

A spatial processor 1602 on ground will perform Rx DBF to "capture" or "separate" 16 signal streams from 20 Rx element signals, which are delivered via the feeder-link 1170 and separated by a FDM demuxer 1121. The 20 inputs are replicated 16 times first. In each of the 16 copies of the 20 Rx signals, a received beam is formed. Each beam is an aggregated stream from the 20 weighted input signal streams. The weighting parameters are to separate a desired signal stream with a unique "signature" among the 20 spatially distributed receiving elements; or a wavefront embedded in the multiple received signal streams from individual elements. The weighting components for a received beam or a beam weighting vector (BWV) for the receiving beam are keys to a summing-after-weighting processing converting 20 concurrently received element signal streams to 16 output signals (or 16 Rx beam signals). There are 16 BWVs, each with 20 weighting components.

Figure 12:
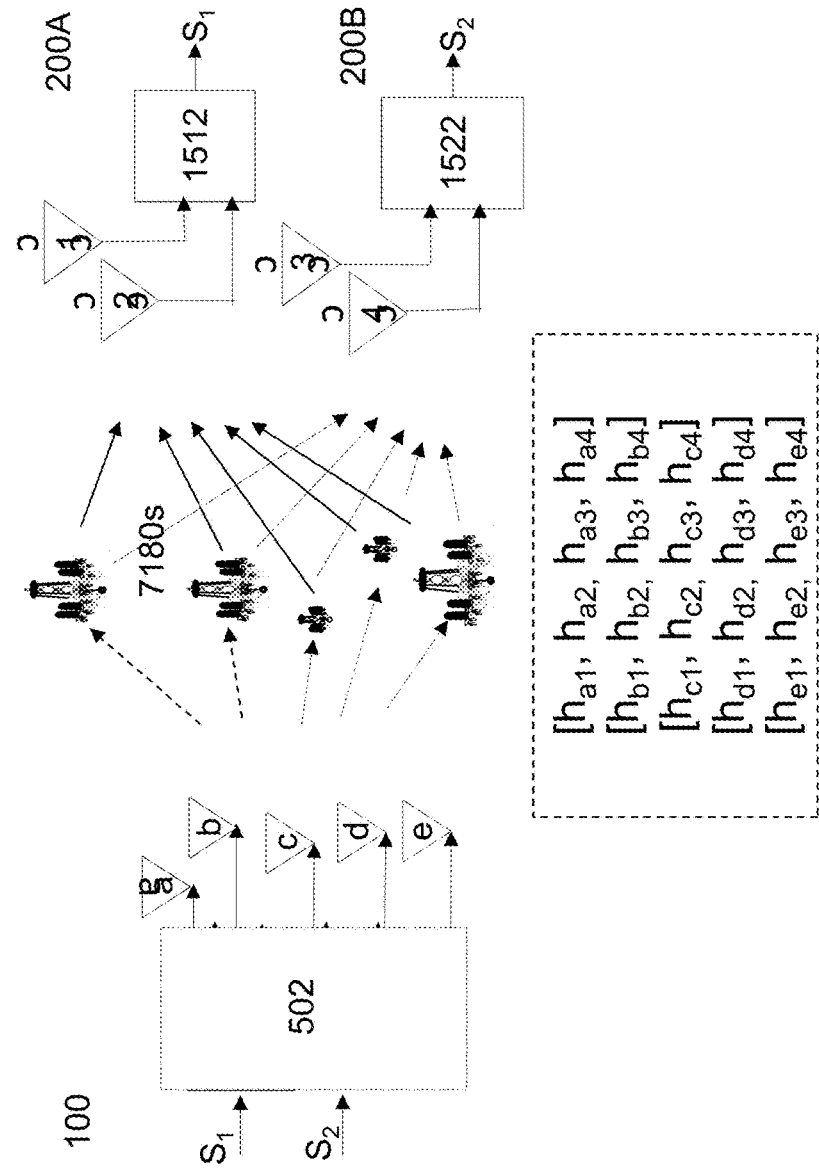
FIG. 12 depicts an example of multiple user MIMO with repeaters distributed on multiple chandeliers via measurement of channel stats information (CSI) to dynamically generate desired performance.

FIG. 12 depicts configurations of N wireless repeaters 7180s for multi-user MIMO. The N repeaters 7180 are anchored on various chandeliers, featuring a common frequency $f_1$ for all repeaters. Continuous and dynamic measurements and calibrations for channel state information (CSI) among the transmitting elements and receiving elements of multiple users are characterized into H-matrices. We used a convention in here with a, b, c, d and e to index transmitting elements, and 1, 2, 3 and 4 to index receiving elements. Each element in the H matrix, say ha1, is a result of amplitude modulations and phase delays due to effects of multipath propagating via multiple parallel active scattering devices from the element "a" of the transmitter to the element "1" of a receiver. FIG. 12 depicts CSI with 20 components; from 5 transmitting elements to 4 elements of two receivers. The propagation paths comprises clusters of multiple active scattering devices 7180s.

Two independent signals $S_1$ and $S_2$ processed by a pre-processor 502 first will be delivered to two separated user receivers 200A and 200B, respectively. $S_1$ will utilize twice the channel bandwidth as compared to the configuration in FIG. 7, so will $S_2$ concurrently. Thus the channel bandwidth is quadrupled.

Figure 12A:
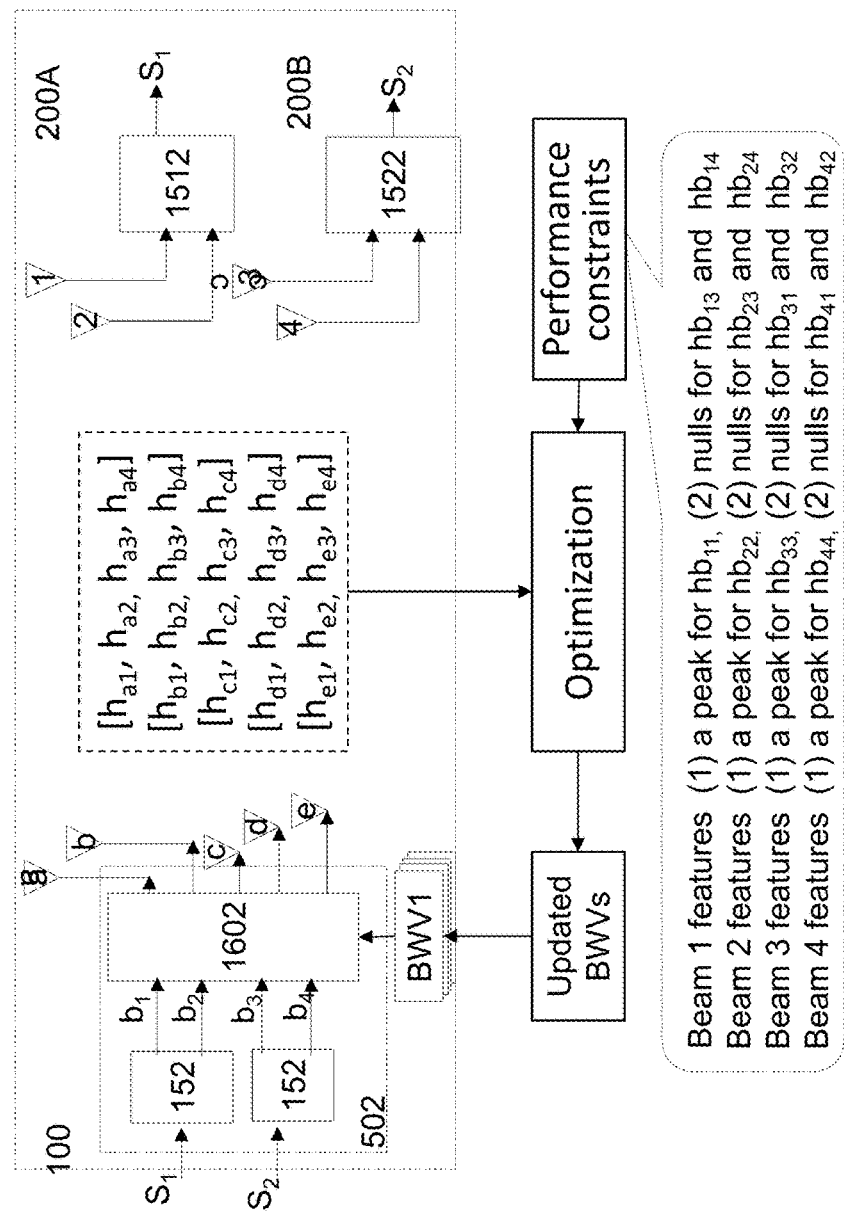
FIG. 12a depicts another example of multiple user MIMO with repeaters distributed on multiple chandeliers via composited transfer functions under a second set of performance constraints for directional discriminations.

Advanced MIMO techniques as described in a U.S. patent application Ser. No. 14/182,665, "Multi-user MIMO via frequency reuse in smart antennas," are incorporated in this application. The major functions of the pre-processor 502 for advanced MIMO processing are depicted in FIG. 12a As a result of dynamically optimized configuration in the spatial processor 1602, its first input port, b1 shown in FIG. 12a, shall feature very high propagation gain to element 1, and nulls at elements 2, 3, and 4 of the receivers. Similarly, its $2^{nd}$ input port, b2, shall feature high propagation gain to element 2, and nulls at elements 1, 3, and 4 of the receivers. Therefore the two signal substreams generated by a first TDM demuxer 152 from $S_1$ and radiated by the b1 and b2 ports separately shall arrive at receiver elements 1 and 2 respectively after propagating through the channels with clusters of active scattering devices 7180s. $S_1$ signals will be reconstructed by a post processor 1512 in the first receiver 200A.

Similarly, the two signal substreams shown in FIG. 12a of $S_2$ will be radiated via the $3^{rd}$ and the $4^{th}$ input ports of the spatial processor 1602, so that the two signal substreams shall arrive only at elements 3 and 4 of the second receiver 200B, respectively after propagating through the channel dominated by multipaths from clusters of active scattering devices 7180s. $S_2$ signals will be reconstructed by a post processor 1522 in the second receiver 200B.

FIG. 12a depicts same sets configurations of N wireless repeaters 7180 shown in FIG. 12 for multi-user MIMO. The N repeaters 7180 are anchored on various chandeliers (shown in FIG. 12), featuring a common frequency $f_1$ for all repeaters. Continuous and dynamic measurements and calibrations for channel state information (CSI) among the transmitting elements and receiving elements of multiple users are characterized into H-matrices. We used a convention in here with a, b, c, d, and e to index transmitting elements, and 1, 2, 3 and 4 to index receiving elements. Each element in the H matrix, say ha1, is a result of amplitude modulations and phase delays due to effects of multipath propagating via multiple parallel active scattering devices from the element "a" of the transmitter to the element "1" of a receiver. FIG. 12*a* depicts the same CSI with 20 components as those in FIG. 12: from 5 transmitting elements to 4 elements of two receivers. The propagation paths comprises of clusters of multiple active scattering devices 7180*s*.

The main differences are the performance constraints. There are 4 independent transmitting (Tx) beams each features a linear combinations of radiation patterns of the 5 elements; el-a, el-b, el-c, el-d, and el-e. To include multipath propagation effects, these element patterns are indexed not as functions of directions but as functions of sequenced indexes of receiving elements The 5 element radiation patterns including multipath propagation effects sampled at all receiving element sites are indicated as Ha, Hb, Hc, Hd, and He. These indexed propagation "sensitivity" or "radiation patterns" from a transmitting element are transfer functions of all propagations to various Rx elements; element 1 to element 4. As examples, the transfer function from el-a of the transmitter to all antenna elements of receivers is represented by Ha, where $$Ha = [h_{a1}, h_{a2}, h_{a3}, h_{a4}].$$

Similarly, the transfer functions from the other 4 elements (el-b, el-c, el-d, and el-e) of the transmitter to all antenna elements of receivers are, respectively, $$Hb = [h_{b1}, h_{b2}, h_{b3}, h_{b4}],$$

$$Hc = [h_{c1}, h_{c2}, h_{c3}, h_{c4}],$$

$$Hd = [h_{d1}, h_{d2}, h_{d3}, h_{d4}],$$

$$He = [h_{e1}, h_{e2}, h_{e3}, h_{e4}].$$

A first Tx beam, Beam 1, features an input port from in the spatial processor 1602 is formed by a linear combination of 5 transfer functions of the 5 transmitting element. To form 4 independent beam, each of the 4 linear combinations is optimized under various performance constraints under a set of optimized weighting parameter, a beam-weight-vector (BWV). A BWV features 5 complex components. Thus the transfer function of the first beam, Beam 1 is represented as HB1, where $$HB1 = w_{1a}Ha + w_{1b}Hb + w_{1c}Hc + w_{1d}Hd + w_{1e}He$$
$$= [hb_{11}, hb_{12}, hb_{13}, hb_{14}].$$

where $$BWV1 = [w_{1a}, w_{1b}, w_{1c}, w_{1d}, w_{1e}],$$

and $$hb_{11} = w_{1a}h_{a1} + w_{1b}h_{b1} + w_{1c}h_{c1} + w_{1d}h_{d1} + w_{1e}h_{e1}$$

$$hb_{12} = w_{1a}h_{a2} + w_{1b}h_{b2} + w_{1c}h_{c2} + w_{1d}h_{d2} + w_{1e}h_{e2}$$

$$hb_{13} = w_{1a}h_{a3} + w_{1b}h_{b3} + w_{1c}h_{c3} + w_{1d}h_{d3} + w_{1e}h_{e3},$$

-continued
$$hb_{14} = w_{1a}h_{a4} + w_{1b}h_{b4} + w_{1c}h_{c4} + w_{1d}h_{d4} + w_{1e}h_{e4}$$

As a result, each of the 4 optimized beams shall meet specified performance constraints; which are indexed not in directions but in Rx antenna elements and beam ports of Tx beams. As example, the optimized spatial processor shall form shaped beams with two nulls and a peaks per shaped beam in FIG. 12*a*. For Beam 1, the transfer function, HB1, are directional or "Rx element position" sensitive such that the magnitude of $hb_{11}$ is maximized as a beam peak, while those of $hb_{13}$ and $hb_{14}$ are minimized or in nulls. So are the three other beams (Beam 2, Beam 3 and Beam 4) as indicated as performance constraints in FIG. 12*a*

For another example, a similar beam in FIG. 12 shall features 3 nulls and one peak. Its transfer function, HB1, are directional or "Rx element position" sensitive such that the magnitude of $hb_{11}$ is maximized as a beam peak, while those of $hb_{12}$, $hb_{13}$, and $hb_{14}$ are minimized or in nulls. There are 5 elements in Tx or 5 degrees of freedom in optimization under 4 directional constraints, and the repeaters are distributed far enough to support the required resolutions.

REFERENCES

1. "MIMO-OFDM Wireless Systems: Basics, Perspectives, and Challenges," by Helmut Bölcskei, Eth Zurich; IEEE Wireless Communications, August 2006.
2. "Multiuser MIMO-OFDM for Next-Generation Wireless Systems," by Ming Jiang, and Lajos Hanzo, Proceedings of the IEEE|Vol. 95, No. 7, July 2007.
3. U.S. Pat. No. 7,324,480, "Mobile Communications Apparatus and Methods including base-station and Mobile station having multi-antennas;" by S. J. Kim and et al; issued on Jan. 29, 2008.
4. "A Survey on the Successive Interference Cancellation Performance for OFDM Systems," by N. I. Miridakis And D. D. Vergados; IEEE Communications Surveys & Tutorials, Vol. 15, No. 1, First Quarter 2013.
5. U.S. Pat. No. 8,111,646, "Communications Systems for Dynamically Combing power from a Plurality of Propagation Channels in order to Improve Power Levels of Transmitted Signals without Affecting Receiver and Propagation Segments," by DCD Chang; issued on Feb. 7, 2012.
6. "Improving MU-MIMO Performance in LTE-(Advanced) by Efficiently Exploiting Feedback Resources and through Dynamic Scheduling," by Ankit Bhamri et al, WCNC 2013, IEEE Wireless Communications and Networking Conference, Apr. 7-10, 2013, Shanghai, China.
7. "A Simple Transmit Diversity Technique for Wireless Communication," by S. Alamouti, IEEE Journal on Selected Areas in Communications Vol: 16, Issues: 8, October 1998.

What is claimed is:

1. A communications system comprising: a transmitter configured to send, in a communication channel, concurrently a plurality of independent streams of information to a plurality of receivers, the receivers being spatially separated, each of the receivers comprising a receiving element, the transmitter comprising transmitting elements which generate orthogonal beams (OBs) using a composited transfer function optimized based on channel state information of the communication channel and performance constraints associated with locations related to the communication channel; and a plurality of active scattering devices distributed between the transmitter and the receivers, each of the active scattering devices being positioned in a direction with respect to a peak or a null of one of the OBs and configured to receive one of the independent streams of information sent by the transmitter and being further configured to re-radiate the received one of the independent streams of information to one of the receivers, the active scattering devices including a first active scattering device, the first active scattering device having an input and an output, both operating at a first frequency and comprising:

a first receiving section configured to receive at the input the one of the independent streams of information at the first frequency and output the received one of the independent streams of information at a second frequency, the second frequency being higher than the first frequency, and a first re-radiating section configured to receive from the first receiving section the received one of the independent streams of information at the second frequency and re-radiate at the output the received one of the independent streams of information at the first frequency.

2. The communications system of claim 1, wherein the active scattering devices are anchored on fixed platforms.

3. The communications system of claim 1, wherein each of the active scattering devices is further configured to have a receiving section and a re-radiating section, the receiving section being configured to be in a field of view of the transmitter, the re-radiating section being configured to be in a field of view of the one of the receivers.

4. The communications system of claim 1, wherein the transmitter further comprises a beam shaping processor for processing the independent streams of information and generating the OBs and outputting the generated OBs to the transmitting elements for transmission.

5. The communications system of claim 4, wherein one of the generated beams is generated under directional constraints with radiation power favoring a direction toward one of the active scattering devices while discriminating against directions toward remaining ones of the active scattering devices.

6. The communications system of claim 4, wherein one of the generated beams is generated under concurrent performance constraints on power reception at each of the receivers such that the one of the generated beams directionally favors one of the receiving elements while directionally discriminates against remaining ones of the receiving elements, the power reception at each of the receivers being from re-radiation of the active scattering devices.

7. The communications system of claim 4, wherein the transmitter further comprises a wavefront multiplexing processor for processing the independent streams of information and outputting the processed independent streams of information to the beam shaping processor.

8. The communications system of claim 1, wherein the transmitter further comprises a spatial processor for MIMO processing the independent streams of information and outputting the MIMO processed independent streams of information to the transmitting elements to radiate the MIMO processed independent streams of information to the receivers, wherein the MIMO processing comprises measuring current channel state information and optimizing transfer functions from the transmitting elements of the transmitter to the receiving elements of the receivers under concurrent performance constraints with radiation power favoring a direction toward one of the receiving elements while discriminating against directions toward remaining ones of the receiving elements.

9. The communications system of claim 1, wherein each of the active scattering devices comprises at least one amplifier.

10. The communications system of claim 1 wherein one of the active scattering devices is positioned in a direction aligned with the peak or the null of one of the OBs.

11. The communications system of claim 1 wherein one of the active scattering devices is positioned in a direction significantly off from the peak or the null of one of the OBs.

12. A communications system comprising:

a transmitter operating in a communication channel and comprising a digital beam forming processor, the transmitter generating orthogonal beams (OBs) using a composited transfer function optimized based on channel state information of the communication channel and performance constraints associated with locations related to the communication channel;

a plurality of receivers; and a plurality of active scattering devices distributed between the transmitter and the receivers;

wherein each of the plurality of active scattering devices is positioned in a direction with respect to a peak or a null of one of the OBs;

wherein each of the active scattering devices comprises a receiving section and a re-radiating section, the re-radiating sections operating as transmitting elements of a digital beam forming array at a first frequency, and wherein the digital beam forming processor processes concurrently a plurality of input signals and generates concurrently a plurality of element signals using remote beam forming processing and transmitting the element signals to the re-radiating sections via feeder-links at a second frequency, the second frequency being higher than the first frequency, the re-radiating section receiving the element signals at the second frequency.

13. The communications system of claim 12, wherein the remote beam forming processing is configured to form a plurality of shaped beams concurrently.

14. The communications system of claim 12, wherein the transmitting elements are distributed on a plurality of platforms.

15. The communications system of claim 12, wherein the digital beam forming processor generates the element signals under concurrent performance constraints with radiation power favoring a direction toward one of the receivers while discriminating against directions toward remaining ones of the receivers.

16. The communications system of claim 12, wherein the transmitter further comprises a wavefront multiplexing processor for processing concurrently a plurality of independent streams of information and outputting the processed independent streams of information as the input signals to the digital beam forming processor.

17. The communications system of claim 12, wherein the digital beam forming processor transforms the input signals into a plurality of weighted input signals and generates each of the element signals as a sum of the weighted input signals.

18. The communications system of claim 12, wherein the digital beam forming array forms a plurality of shaped beams concurrently tracking the receivers dynamically.

19. The communications system of claim 12, wherein each of the active scattering devices comprises at least one amplifier.

20. A communications system comprising:
- a transmitter operating in a communication channel and comprising a digital beam forming processor, the transmitter generating orthogonal beams (OBs) using a composited transfer function optimized based on channel state information of the communication channel and performance constraints associated with locations related to the communication channel;
- a plurality of user equipment terminals transmitting a plurality of user signals; and
- a plurality of active scattering devices distributed between the transmitter and the user equipment terminals, the active scattering devices being anchored on stationary platforms;
- wherein each of the active scattering devices is positioned in a direction with respect to a peak or a null of one of the OBs and comprises a receiving section and a re-radiating section, the receiving sections operating as receiving elements of a digital beam forming array, the receiving sections receiving the user signals at a first frequency and transmitting the received user signals as a plurality of element signals to the transmitter via feeder-links at a second frequency, the second frequency being higher than the first frequency, and wherein the digital beam forming processor receives the element signals at the second frequency and performs remote beam forming processing on the received element signals to recover the user signals.

21. The communications system of claim 20, wherein the digital beam forming array forms a plurality of shaped beams concurrently tracking the user equipment terminals dynamically.

22. The communications system of claim 20, wherein each of the active scattering devices comprises at least one amplifier.

* * * * *